United States Patent [19]

Becker

[11] 4,090,340
[45] May 23, 1978

[54] LOAD BEARING STRUCTURAL ELEMENT

[76] Inventor: Otto Alfred Becker, Robert Koch Strasse 59, 66 Saarbruecken 6, Germany

[21] Appl. No.: 533,453

[22] Filed: Dec. 16, 1974

Related U.S. Application Data

[63] Continuation-in-part of Ser. No. 502,094, Aug. 30, 1974, abandoned.

[30] Foreign Application Priority Data

Aug. 30, 1973 Germany .............................. 2343792
Dec. 15, 1973 Germany .............................. 2362497

[51] Int. Cl.² .............................................. E04B 1/74
[52] U.S. Cl. .................................. 52/618; 52/309.11; 52/309.14; 52/615; 428/116
[58] Field of Search ................. 156/285, 382; 52/173, 52/269, 309, 404, 405, 406, 407, 425, 615, 618, 172, 619; 428/72, 73, 116, 117, 118, 119, 120, 35

[56] References Cited

U.S. PATENT DOCUMENTS

| | | | |
|---|---|---|---|
| 1,956,323 | 4/1934 | Gregg | 52/618 |
| 3,501,367 | 3/1970 | Parker | 52/615 |
| 3,616,139 | 10/1971 | Jones | 52/615 |
| 3,646,721 | 3/1972 | Becker | 52/618 |
| 3,803,784 | 4/1974 | Becker | 52/173 |
| 3,834,096 | 9/1974 | Becker | 52/172 |

Primary Examiner—Caleb Weston
Attorney, Agent, or Firm—Erich M. H. Radde

[57] ABSTRACT

A structural element is provided which is preferably made of metal or plastic and which is useful as load-bearing element of high bending strength for various structures, supports, bridges, vehicles, as load-bearing foundation, and for many other purposes. Such structural element consists of two or more shells or plates which surround at least one cavity. Said cavities are equipped with load-bearing supporting elements, shells, panels, and the like which are associated with pressure plates, preferably honeycomb or grid-like plates. The ribs or ridges of said honeycombs or grids are relatively small, i.e. very narrow. The structural element, furthermore, comprises at least one flexible or movable plate which exerts a pressure onto the elements inserted into the cavity or cavities. Said pressure is equal to or greater than atmospheric pressure and higher than the pressure in the support cavity. The structural element of this invention may also be of tubular shape. It can be provided with fire protecting or extinguishing means. The structural element has an excellent sound- and heat-insulating capacity.

11 Claims, 7 Drawing Figures

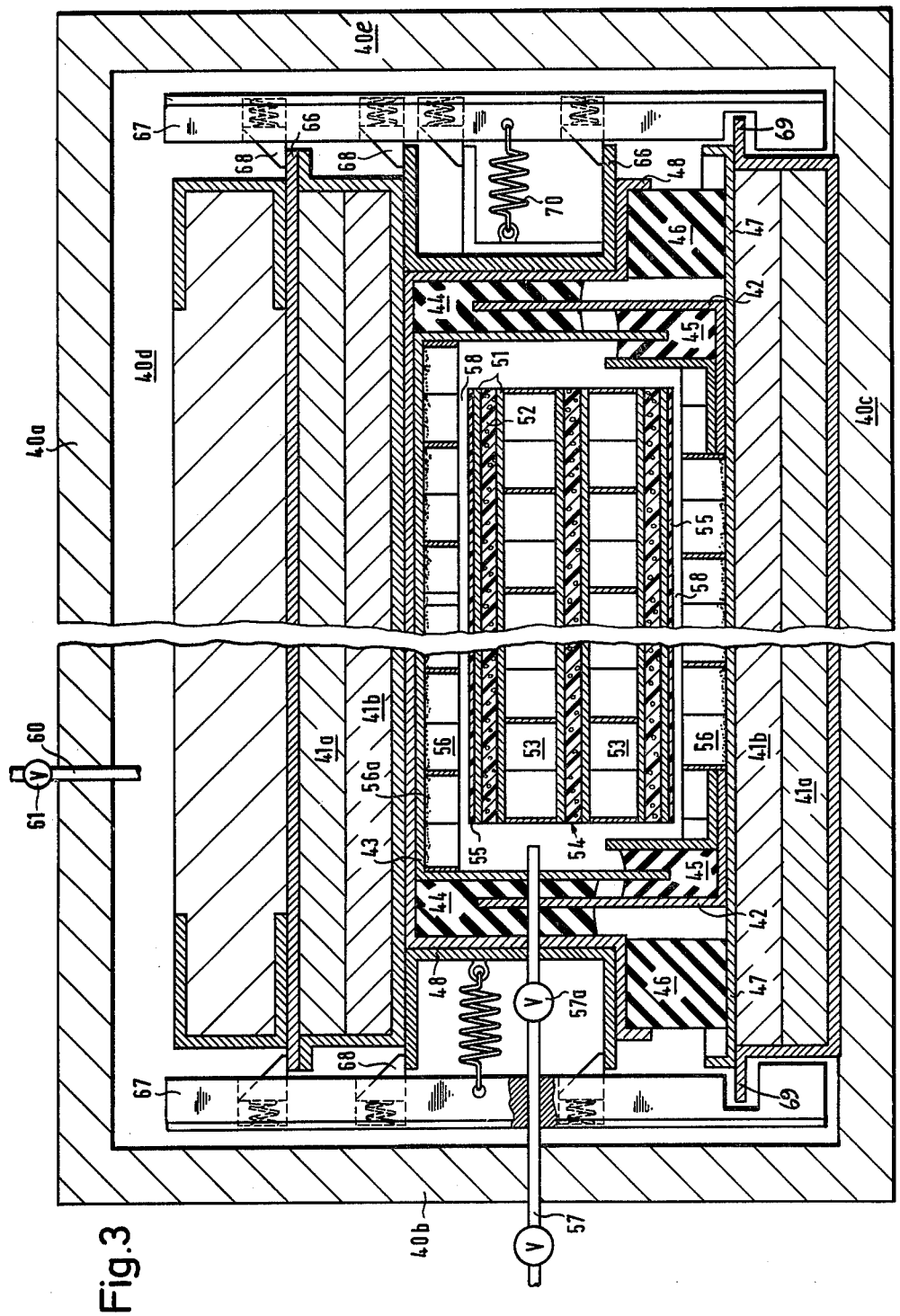

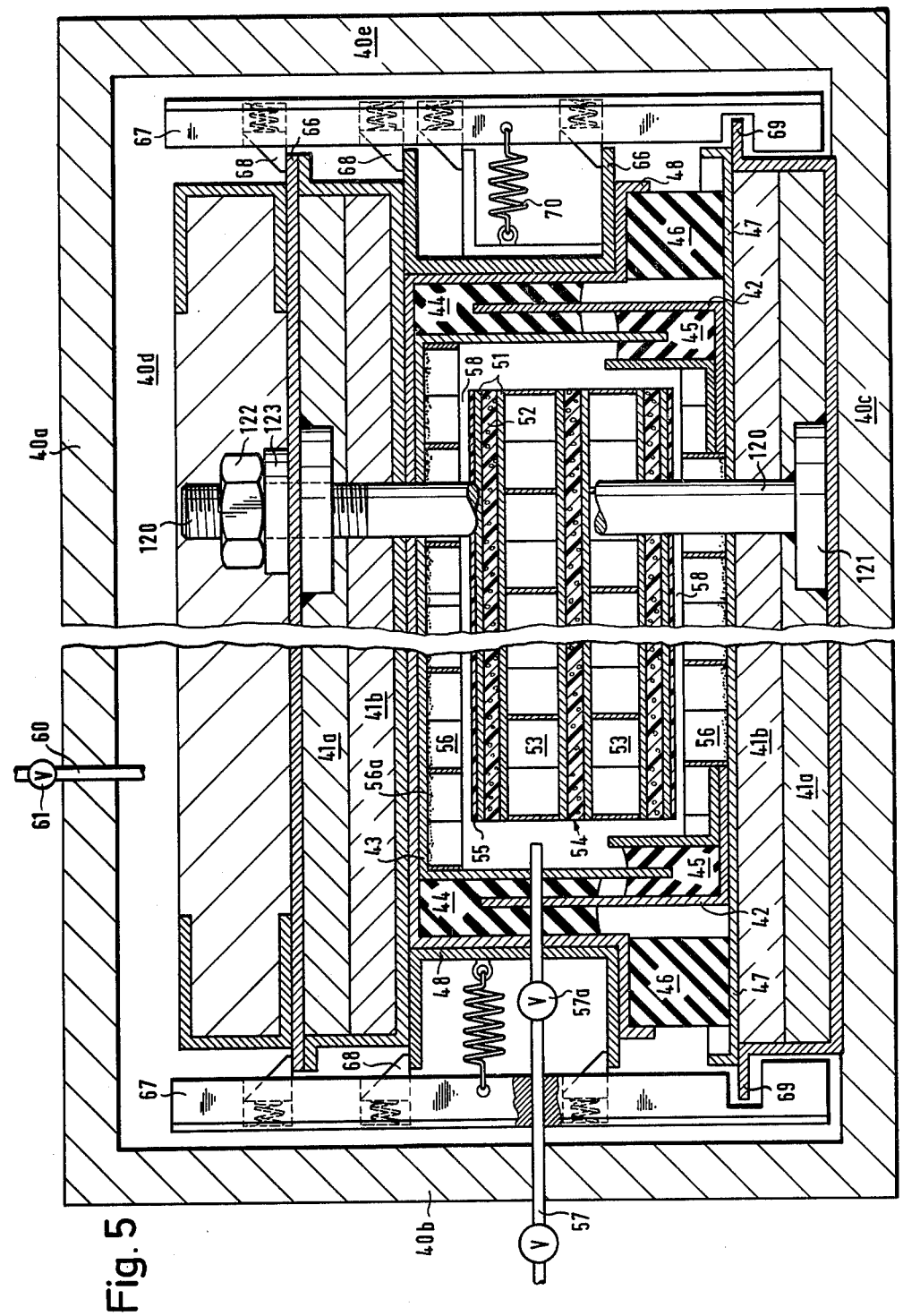

LOAD BEARING STRUCTURAL ELEMENT

CROSS-REFERENCE TO RELATED APPLICATION

This application is a continuation-in-part of my earlier application Ser. No. 502,094, filed Aug. 30, 1974, now abandoned, and bearing the same title.

BACKGROUND OF THE INVENTION

(1) FIELD OF THE INVENTION

The present invention relates to a structural element and more particularly to a load-bearing structural element useful, for instance, as wall element, for structures, supports, bridges, vehicles, and others.

(2) DESCRIPTION OF THE PRIOR ART

Structural elements which consist of two or more structural shells or panels of at least one sealing packing lying between the edges of the shells or panels, and a cavity hermetically enclosed by them have been described heretofore. In the cavity of said elements pressing means, for instance, honeycomb plates with interposed solid plates, for instance, metal plates and associated sealing plates, for instance, foam-plastic plates which can be covered with vapor-proof sheets, for instance, aluminum foils, are provided and at least one of the structural shells or panels is arranged so that it can shift its position flexibly, or can be bent, for instance, concavely against the seal, and a vacuum is produced within the cavity.

As a result of the elimination of air counter-pressure or back pressure within the structural element, the external air pressure causes at least bending or sagging of the flexible structural shells or panels and/or in particular a change in place of the structural shells in direction towards each other by compression of the seal and the cavity inserts. As a result of said atmospheric pressure, the inserts in the cavity, particularly the honeycomb webs straps, are placed under tension and press with this force against the interposed metal plates and the inner sides of the structural shells. This results in increased resistance to bending of the inner plates and intermediate panels or sheets supported in this manner, as well as of the outer structural shells or panels, in the event that they are acted on by load in the direction of their planes. In the case of a vacuum, this amounts, perpendicular to the outer shells or panels and the honeycomb plates on the surfaces of the metal plates arranged in the cavity and other intermediate plates, to about 10 tons per sq.m.

This atmospheric pressure is of randomly caused order of magnitude. It is determined by the gravitational force of the earth on the atmosphere, the composition of the air as a mixed gas, and the height of the atmosphere.

SUMMARY OF THE INVENTION

It is one object of the present invention to provide a structural element, preferably of metal or plastic, and in particular a load-bearing structural element, the use of which is of great advantage especially in the following fields:

Construction engineering, vault construction, dome construction, tunnel construction, underground installations, underwater structures, formation of supports, piles, girders, frameworks, masts, chimneys also in the form of load-bearing pipes and pressure pipes, furthermore bridge construction, vehicle construction, for instance of land, sea, air, and space vehicles, container construction, and as load-bearing foundation construction; also for machines and objects, as well as for supporting walls, water-retaining dams, breakwaters, and the like. This enumeration is not exhaustive.

A further object of the invention is to provide improved heat- and sound insulation in the load-bearing structural element. Heretofore, such sound insulation was achieved in the art by absorption of the oscillation energy of the sound rays or waves. This requires considerable masses of structural material per square unit for the wall. The absorption can be increased by combination or by composition construction with soft, porous materials which are not capable of oscillating. The structural material itself can consist of such combinations of material which have an increased absorbing effect on sound oscillation. Another object of the present invention is to provide a process of manufacturing such a structural element in a simple and effective manner.

Still another object of the present invention is to provide an apparatus for manufacturing such a structural element.

The structural element according to the present invention is composed of two or more structural shells or plates which enclose or envelope at least one cavity or hollow space. If required, suitable packings or border strips are provided at least between the edges or bordering parts of said shells or plates. In the hollow space or spaces there are arranged propping, reinforcing, or bracing means, for instance, honeycomb plates or spacing strips or bars, preferably with interposed solid plates, for instance, metal plates. If necessary, sealing or tightening plates, for instance, plastic foam plates, which are preferably covered with vapor-tight foils, for instance, of aluminum, are provided. At least one of the structural shells is movably arranged so that it can change its position and/or is flexible, for instance, concavely bent or deflected. A vacuum or a pressure which is lower than the pressure acting from the outside on the propped or supported shells, is produced in the hollow space or cavity.

As a result of the elimination of the atmospheric pressure within the structural element, the external air pressure causes at least bending or sagging of the flexible structural shells or panels and/or in particular a change in place of the structural shells in direction towards each other by compression of the seal and/or the cavity inserts. As a result of said atmospheric pressure, the inserts in the cavity, particularly the propping or supporting means, the honeycomb webs or straps, or the shells of the cavities are places under tension and press with this counter force against the interposed metal plates and the inner sides of the structural shells. This results in increased resistance to bending of the inner plates and intermediate panels or sheets supported in this manner, as well as of the outer structural shells or panels, in the event that they are acted on by load in the direction of their planes. In the case of a vacuum, this amounts, perpendicular to the outer shells or panels and the honeycomb plates on the surfaces of the metal plates arranged in the cavity and other intermediate plates, to about 10 tons per sq. m.

The preferably concavely bent or deflected structural shells or panels are kept from each other at their border parts by means of packings and, if required, of other means at a distance which is greater than the distance produced by the action of tightening screws or clamp bolts in the central parts of the shell or panel surfaces.

Said shells or panels have the tendency, when subjected to increased load, to further decrease their distance from each other in the direction parallel to their planes or surfaces. As a result thereof a correspondingly increased counter tension of the propping, bracing or supporting means, for instance, of the honeycomb plates, of the walls of the cavities or chambers, of the spacing strips, and thus a corresponding reinforcement of the local bracing shells or panels and of the plates provided in the cavity or hollow space is achieved.

This atmospheric pressure is of randomly caused order of magnitude. It is determined by the gravitational force of the earth on the atmosphere, the composition of the air as a mixed gas, and the height of the atmosphere.

Structural shells of sheet metal which contain an elastic plastic layer, particularly a highly viscous thermoplastic material, for instance vinyl acetate copolymers, or foils of vinyl copolymers in two layers each between said structural shells to thus form a sandwich composite plate are known in the art. The oscillation energy in such plates is converted in said layers into heat due to tangential stress or shearing stress. As a result thereof the prerequisite for a radiation of the sound towards the interior is eliminated to a considerable extent before the inner composite sheet metal is reached.

The sound transmission level is considerably decreased and the bending strength or rigidity is increased. Reduction of the sound energy as achieved by this manner of sound-proofing, however, is only achieved up to 35 decibels. This is insufficient to achieve the required sound proofing effect.

In accordance with the present invention, the sound insulation is achieved almost without absorption of the oscillation by reflection of oscillation. At least one layer and preferably several layers of honeycombed plates, preferably consisting of insulating material, for example, hardened Kraft paper or cardboard or plastic are employed in order to acoustically and thermally insulate the structural element in a lightweight construction manner. For this purpose the honeycombed plates are provided with highly reflecting surfaces and are tightly sealed on both sides with highly reflecting aluminum foils or the like. Each individual cell thus forms a reflecting chamber which is closed on all sides.

The present invention is based, among other features, on the concept to produce the compressive forces as required independently of the above-explained compressive force caused by the earth and thus to obtain pressure differences either with respect to a vacuum or with respect to a partial vacuum or some other lower degree of pressure. This is achieved according to the present invention by pressing alternately arranged local bearing, supporting, propping, or bracing plates, heat and/or sound insulating plates, honeycomb or grid plates with preferably narrow ribs or bridges transversely to their principal plane or surface. For this purpose the hollow spaces or cavities of the structural elements are evacuated before exposure to pressure action preferably in an evacuating housing. As a result thereof there is produced not only a highly bending resistant or rigid structural element but also, especially on account of the still present but evacuated cavities or hollow spaces, a construction element which has an especially high sound and heat insulating capacity. In this connection the extraordinary increase in the action of the pressure by concentrating a given pressure force on a few places of linear pressure contact is of considerable importance for the pressure action on solid surfaces to be supported, by providing, for instance, narrow, flexure-resistant, low honeycomb webs of, for instance, steel, with honeycomb sizes which are relatively large as compared with the webs or bridges of the webs. In this way the result is achieved that the pressing force, instead of being transmitted from one total surface to the other total surface, is corresponding to the honeycomb structure- transferred only in honeycomb-like fashion linearly to the surface to be supported. Said lines of contact constitute, for instance, less than 1% of the total surface. The pressing force acts only on these structured lines of contact which are distributed in a network-like fashion over the entire surface. If the structural shells or panels are pressed together with a vacuum in the cavity, for instance, with the atmospheric pressure of about 10 tons, then the linear surface parts contacted directly in net-like manner by the honeycomb webs, bridges or ribs and constituting about 1% of the total surface of the solid surface intermediate plate are pressed together with a force of about 100 × 10 tons = 1000 tons. The pressure of 1 atm. gauge, if necessary, can be increased as desired by air-pressure pumps and apparatus. With a pressure, for instance, of 100 atmospheres, there is obtained an increase in pressure of 100,000 tons of pressure, with respect to the linear net-like contact points on the shells and supporting plates which are to be pressed. The load-carrying capacity of the supporting plates pressed in this manner is of about the same value insofar as the intermediate spaces or portions (areas) not contacted by the honeycomb webs, bridges, or ribs are sufficiently resistant to bending under said load.

The resistance to bending of each individual portion (area) of the surfaces is caused by the resistance to bending of the supporting plate itself, with due consideration of the size of the partial surface.

Since, however, each individual partial surface takes up a relatively small percentage of the total surface, their resistance to bending is correspondingly high. Thus the honeycomb (cell, chamber) widths can be maintained approximately large enough so that the partial surfaces of the supporting plates which are defined by them, a resistance to bending as required in each case. In this way it is possible to increase the ratio of the net-like contact by means of the honeycomb webs, bridges, or ribs as compared with the total area of the inner supporting plate for maximum concentration of the pressure force on the smallest possible proportion of the surface of the plates to be supported. On the other hand, the resistance to bending of the load carrying plates to be supported can be increased in advance by developing them as composite plates in sandwich or multiple compound fashion by the use of plastic material of the highest bending power, and particularly by use of solid but preferably still elastic plastic material specifically suited therefor as center or core of the composite structure, by which the thrust forces are prevented from loosening the outer cover plates of the composite plates.

There can thus be obtained honeycomb widths which produce a maximum multiplication of the pressing forces by even further concentration on a few honeycomb webs, bridges, or ribs or on pressing surfaces taken up by them.

Another possibility of increasing the resistance to bending residues in the development of structural shapes, for instance, of trapezoidal profiles or channels in compound construction with solid plastic materials and in the combination of such composite profiles or shapes with each other. They can be covered by flat composite plates, having a real contact with the pressing means, for instance, the honeycomb plates and can be firmly connected or joined thereto, for instance, by glueing or welding.

It is advisable to support the honeycomb bridges or ribs, for instance, by partially introducing foam into the honeycomb in situ by means of firmly adhering rigid foam. Evacuation of the cavities is not necessary required. The decisive factor is the pressure difference between the pressures in adjacent cavities which are separated hermetically from one another by a movable structural shell or plate.

In the same way as in the case of vacuum or reduced pressure, it is necessary, for reasons of safety, also the divide the cavity in which a pressure greater than atmospheric pressure is present, into a large number of partial spaces, for instance, by honeycombs or grids, so that they are closed off hermetically from each other and from the entire cavity. In case of a partial destruction of the outer parts of the cavity and of the corresponding inner parts, the parts which are still not destroyed can still exert excess pressure without change. Furthermore, by appropriate subdivision, the effect of possible damage can be restricted to a minimum. Since the excess pressure tends to increase the volume taken up, the hermetic closing off of such honeycomb spaces which are under pressure is only possible if, as the result of an even greater outer pressure, the sealing plates arranged on the inside for sealing off the hoenycombs are pressed from the outside into the honeycombs by said correspondingly higher pressure and if said state or condition is maintained.

The movable structural shells or panels of displaceable position therefore must be locked in this condition of their smallest distance from each other in order to definitely maintain the compressive stress produced by the position assumed by them for an unlimited period of time. For this purpose, various means can be provided which will be described hereinafter.

In my prior application Ser. No. 502,094, filed August 30, 1974, now abandoned, a construction element is described which consists of two or more building shells, at least one sealing unit positioned between the shell edges, and a hollow space hermetically enclosed thereby, wherein means to be pressed on e.g. honeycomb plates, with intermediate fixed plates, complete the construction element.

In accordance with another embodiment of the present invention, there is further provided a welding of the honeycomb plates, grid plates and/or other plates which constitute the core (or cores) between the load-bearing building shells and/or building plates, together with the adjacent surfaces of the said plates to a fixed, airtight and vapor tight unit, preferably in a vacuum chamber, for instance, under a real pressure by means of a welding current, especially a capacitor-impulse welding current, (for welding metals) or a high frequency current (for welding plastics). For the purpose of such welding, the building shells or building plates, as well as the core-forming plates are preferably of steel or aluminium or of plastic material. The honeycomb plates or grid plates may be made, for instance, of trapezoid or undulating bands, in which structure they support further bands which extend between these bands rectilinearly and are somewhat wider than the honeycomb-forming or grid-forming shaped bands and overlap toward both sides, e.g., by about 1 mm. Due to such structure, only these somewhat higher positioned intermediate bands come in contact with the building shell surface during the welding of the hoenycomb plates, grid plates, or the like. The air can first be evacuated by way of these air gaps, or a positive air pressure can be established in the honeycombs, chambers, cells, or the like.

The welding can be carried out e.g., as resistance welding or as electronic welding (electric arc welding), or as combined resistance-electronic welding, or as high frequency welding for plastics. In the case of electronic welding the electrons are ejected from the cutting edges of the honeycomb bridges upon the metal surfaces of the adjacent metal building shells or metal building plates and thereby the parts to be welded together are melted-on and in this state are pressed toward each other and thus welded together. By this welding, each individual honeycomb, chamber, cell, or the like is sealed toward the outside in a vapor tight manner. In these hollow spaces there exists for an unlimited period of time the air or gas pressure or a vacuum produced in a prespecified manner in the hollow welding space.

In the electronic welding or the electric arc welding the optimum welding duration can be determined by the greater height of the, for instance, rectilinear intermediate bands or the honeycombs or the like. This welding duration corresponds then to the time required for melting away the overlapping height of the inserted bands. For the purpose of optimum welding all other welding data must also be brought into an optimum ratio thereto.

The honeycomb bridges, grid bridges, or the like, may, for the purpose of forming airgaps and thus for allowing evacuation of the cells or chambers, also be shaped in another manner; thus they can be provided, e.g, with teeth at the cutting edges. Furthermore, the metal surfaces of the adjacent building shell can be provided with, for instance, linear stiffening corrugations which cause formation of airgaps until the stiffening corrugations have been welded together, at the points of contact with the honeycomb or grid bridges, or the like, in such a manner that the entirety of the bridges likewise comes in contact, and is welded together, with the adjacent building shell surfaces and with each other. Thereby all honeycombs, chambers, cells, or the like can first be evacuated and then be sealed off in vaportight manner. The honeycombs, grids, or the like, and likewise the surfaces of the building shells may consist, as mentioned hereinabove, of plastic materials and be welded together, by high frequency. This must take place likewise under optimum conditions, established in the welding space.

Such parts, firmly connected with each other to composite plates may, depending on suitability, be provided in multiple numbers and evacuated, by arranging the honeycombs or grid plates on both sides at the surfaces of the building shells or plates and the inserts. Excess pressure chambers may be assigned at one or both sides to such composite plate units, which excess pressure chambers serve to increase the bending strength of the load-bearing parts of the composite plates whereby the force component acts vertically to the surfaces of the shells and plates.

The combination may also take place in such a manner that the excess pressure chamber is arranged between two composite plate units. By means of the excess pressure chambers the honeycombs or grid bridges are, in correspondence to the excess pressure exerted upon the building shells or covering plates thereof, put under tension which they in turn exert as a counteracting force on the load-bearing building shells or building with their inserts, thus increasing the bending strength thereof correspondingly. It is also feasible to place in front and/or behind the parts concerned, between a flexible internal building shell or building plate which is flexible or of variable position and a composite unit elastic layers, e.g. rubber plates, plastic foam material plates. The expansive force of the excess pressure can be limited by providing tightening screws and clamp bolts to its spatially intended extent. Since the horizontal force component derived from the force of the load amounts to only a small fraction of the load, it is possible to increase extra-ordinarily by means of either gaseous or liquid or solid substances filled into the excess pressure chambers the bending strength and as a result thereof the breaking or ultimate strength in combination with honeycomb ribs or chamber or cell walls by applying such a supporting excess pressure. Porous layers are to be made universally airtight and vaportight, e.g., by means of metal foils or polyethylene foils and or sheet metals. If required, there are to be interposed preferably elastic layers to yield composite structures. The excess pressure produced in the construction element in one or more excess pressure chambers must be introduced in the form of tensioning means into the supporting shells of the construction element, preferably by way of the bridges of the core building material.

The core, especially the plates with honeycombs, grids, or the like are also constructed as load-bearing plates. This can be done in such a manner that, especially in vertical direction, the parts that form the core plates are all constructed as load-bearing plates and are deformed spatially, for instance, in a corresponding manner as vertical (upright), trapezoid or undulating load-bearing plates which in horizontal direction are subdivided, in an airtight and vaportight, stationary manner, into individual chambers, cells, or the like. Such trapezoid plates may, with their horizontal or their transverse subdivisions, be rigidly connected with adjacent plane plates or with plates which are likewise constructed as composite plates, for instance, by welding and form an entire composite unit. They may also be connected in a manner of variable position, with adjacent pressure chambers and may be supported thereby so as to be in elevated fixed position. In order to increase the breaking strength of such shaped vertical core plates they may be crosswise connected, for instance, with horizontal, trapezoid plates, e.g., by welding and/or cementing and may carry between them separating metal sheets by which the chambers, cells, or the like thus formed are sealed in an airtight manner.

Such core elements may also, individually or as a unit, universally be sealed toward the outside by cementing and/or welding in an airtight and vaportight manner, e.g., by metal or plastic material parts and/or layers. Many shapes and combinations are possible which may serve the same effect.

Finally, it is also possible to provide the chambers, cells, honeycombs, or the like, of such composite plates with a higher pressure than that of atmospheric pressure and to use, e.g., flexible, welded-on cover plates as an airtight seal of such hollow spaces and to exert, by means of the flexibility thereof, a pressure upon adjacent, evacuated chambers, preferably rigidly connected with the said cover, and arranged e.g. crosswise thereto, so as to increase the bending strength of the latter. For this purpose it is suitable to give a relatively large size to the excess pressure chambers, honeycombs, or cells, in order to enable the free surfaces limited by the bridges to present sufficient flexibility for exerting a pressure upon adjacent honeycomb bridges, cell or chamber bridges, which in turn can support the load-bearing plates or parts thereof, as well as the, e.g., trapezoid core plates, in an improved bending resistant manner. The bridges of the honeycombs, cells, chambers, or the like can be kept in any suitable bending-proof thickness and height, depending on requirements due to the selected material, or they may be reinforced by material combination or compound arrangement and/or fillings. The edges of these bridges may also preferably be constructed as sharp as a knife and/or they may be toothed or serrated, in order to make possible resistance and/or electronic (electric arc) and/or high frequency welding.

The larger the partial surfaces limited by the honeycombs, cells, bridges, of the cover plates or the load-bearing building shell happens to be, the stronger, at equal pressure, must be the bridges, and the more favorable can be, on the other hand, the ratio between the contacted surface areas and the total surface of the building shell, and thus the concentration of the pressure upon the surface portions of the adjacent load-bearing shells or compound plates. The transverse subdivisions, e.g., of the trapezoid surfaces for the formation of chambers may be of any suitable material, e.g., metal, plastic material, rubber. Their mutual airtight seal may also be produced, in addition, by the pressure of the adjacent cover plate and by thus produced compression or by welding.

The composite building element can also be made without the sealing, and then this element can be introduced into the hollow space of a larger building element. The building plates or shells of the internal building element can therefore be connected with those of the external element, e.g., by cementing plastic material foils or cementing layers. Then the hollow space which may still remain between the internal and the external building element can separately be evacuated. The breaking strength of such a building element is assured by the internal building element.

In accordance with a further aspect of the invention, intermediate layers are provided between an insulating group and the succeeding insulating group, for instance, of the same type between any two aluminum foils. Such intermediate layers are composed particularly of insulating material, for instance, insulating plates of plastic foam, glass fibers, felted cardboard, and/or also metal sheets.

The structural element can be made up and assembled in a room, the air of which is dehydrated to such an extent that condensation of water vapor present in the air in the cells is excluded after the insulating groups have been produced. This is of great importance because even a very slight precipitate of water upon the reflecting aluminum surfaces of the cell will almost completely nullify or cancel their reflective power for heat rays.

The structural element can also be assembled in a room in which the air is evacuated. Since the air in the structural element, on evacuating the surrounding space, tends to escape outwardly from the cells under atmospheric pressure, i.e. with a force of 10,000 kg./sq.m., the horizontally superposed layers of such a structural element are slightly lifted until the weight per sq.m. is equal to the residual air pressure remaining in the structural element. If, for instance, this weight is 20 kg./sq.m. above the resting lower structural shell, this corresponds to 1/500 of the atmospheric pressure which is previously [initially] present therein (10,000 kg.). The residual pressure at which the superposed layers settle or sag upon each other, thereby mutually sealing each other, thus amounts to only 1/500 of an atmosphere (= 1000 g. divided by 500, i.e. 2 g. per sq.cm.). If the air is subsequently again introduced in such a space which can be evacuated, the atmosphere presses from the outside with a force of 10,000 kg./sq.m. upon the upper wall shell and thus presses said shell against a circular packing so that the structural element is air-tightly sealed on all sides in the above-described evacuated state. Thereafter screws which have already been loosely inserted at an earlier time, can be tightened preferably until a predetermined distance is achieved. As a result thereof the following effect is obtained:

The structural shells can abut not at all or only slightly against the insulating groups or the panel of the hollow space depending upon the dimensioning of their marginal angle and/or their packings. In this case the residual oscillations into which the composite sheet metal is set, are only to a slight extent or not at all transmitted to the adjoining layers as sound conducted through solids. Between the composite sheet metal or, respectively, the aluminum foil fastened thereon and the additional aluminum foil closing the honeycombed cells, there can be arranged sound-proofing intermediate layers, for instance, a fiberglass mat or web or a plastic foam plate as above described. These intermediate layers can take up partly in an absorbing manner the sound oscillations. If the honeycomb cells are completely evacuated, no sound oscillations can be transmitted through the free space. Sound can be propagated only via matter which can be set in periodic oscillations. The honeycomb ribs remain as bridges for sound conducted through solids for a further transmission of the sound. Assuming that the first insulating group or, respectively, the honeycomb plate has taken over the oscillations via the ribs, these ribs can be placed at the opposite side vertically against sound-proofing plate material, as stated above. In this manner a further part of the oscillation energy is again converted into heat by the damping effect. This can be continued as frequently as desired so that total conversion of the oscillation energy toward the opposite structural shell is achieved with certainty. In case the structural shell could still be caused to oscillate because, for instance, only one insulating group is arranged therebetween, such oscillation would be converted into heat via the successive cavity which is limited with respect to the structural shells by an inner wall of any desired material. In addition thereto, said cavity can be provided either in the same manner as the cavity or, for instance, with other spacer means.

In the aforesaid example the structural shells can be formed more or less flexible or resistant to bending depending upon the requirements. As a result of the vacuum in the structural element, there occurs a concave more or less pronounced bending of the structural shells in the direction towards each other. Due thereto the shells are under a static tension. This concave tension renders difficult the formation of transverse waves due to the correspondingly high inherent frequencies which are produced by the degree of tension. These inherent frequencies absorb only those oscillations from the sound or frequency mixture, for instance of the street noise which correspond to their fundamental oscillation and to overtone oscillations which are in an integral proportion therewith. Thus a selective resonance occurs while all other oscillations energies are reflected from the outer surface of the structural shell as from a hard shell wall. Thus absorption of all sound radiations or emissions which are not in reasonance is not achieved. Thus the greatest part of the sound energy of mixed frequencies is prevented from entering the structural element. Regarding the conversion of the remaining resonance energy into heat, there applies what has been explained hereinabove.

In a further embodiment, the structural shells or structural plates can be made flexible or can be dimensioned correspondingly and can firmly press the insulating groups arranged therebetween by means of the external atmospheric pressure. This is of special importance with respect to load-bearing structural elements. In this case, the insulating groups serve at the same time as supporting cores. By pressing the honeycomb ribs into the insulating layers arranged between aluminum foils, for instance, compressible plastic foam plates, the foils are pressed in a convex manner with tension into the cells like cushions or padding. The pressure of the honeycomb ribs against the composite metal sheets upon the lines of contact is a multiple of the force which results from the pressure of the structural shells (10,000 kg. per square meter) by reducing the lines of contact to the corresponding structure of the honeycomb ribs which are distributed in a polygonal net-like manner over the inner surfaces of the structural shells, for instance, with a contact of only 4% per square meter of the inner surface. The honeycomb ribs thus exert 25 times the counter pressure upon the lines of contact. This net-like pressing structure develops oscillation common or nodal lines on the structural shells. Thus the structural shell can absorb and emit only oscillations as they correspond to the natural or inherent frequency of such a small partial surface corresponding to the boundary lines of the cells. These natural or inherent frequencies are so high that they are beyond the audible limit. As a result thereof all those frequencies which are contained within the sound mixture of the noice acting from the outside, are completely reflected. The honeycomb ribs which form the common or nodal lines are also not able to oscillate because the nodal lines are not oscillating. As a result thereof this possibility of transmitting sound energy from the one structural shell to the opposite structural shell is also excluded.

A further variant consists in the feature that, as mentioned hereinabove, the cells are filled with dried air. In this case partial reflection of the energy of the sound conducted through solids can take place as aerial sound between the aluminum foils closing the cells. This reflection encounters a high interfacial resistance due to the difference in density of the two media (metal - air). Its magnitude is determined by the foil as metal in the present case. As has already been explained, the compressible insulating plates which carry the aluminum foils are pressed in a convex manner under tension into the cells spaces. If these metal foils were free at both sides, they would possess a high inherent frequency and thus a corresponding selective resonance. Because, when pre-stamping or pre-pressing of the aluminum foil into the cell filled with air, the one surface of the foil, namely that surface with which the aluminum foil rests against the insulating plate, is pre-pressed and tensioned by the latter, no natural oscillation frequency can occur. This means that said metal foil cannot transmit the sound absorbed by it to the air layer in the absence of any oscillation possibility. The sound energy which acts from the insulating plate upon the convex pre-pressed and thus tensioned inner side of the aluminum foil is almost completely reflected from the latter as from a non-sound-absorbing wall.

It is advantageous to make the insulating plate of plastic foam with closed pores. The sound intensity, i.e. the magnitude of amplitudes is at least diminished.

The aluminum foils which rest on both sides against said insulating plates and enclose them project the sound oscillations which partly have passed therethrough, into the porous cells of the plastic material with closed pores. At the boundary surface between the porous wall and the air in the pores there is effected at least partly complete reflection depending upon the position of the angle, and partly penetration into the air-filled pores. Circulation takes place in said pores approximately corresponding to a polygon inscribed in a circle. As soon as the sound oscillations leave their track or course, they are reflected by means of the aluminum foils which surround the foam plate on all sides, again from said foils as in a complete mirror chamber corresponding to the honeycomb cells reflecting all over from one inner surface of the mirror-like adjoining foil to the other foil. Thereby partly stationary waves at the same frequency and partly interferences and furthermore partly extinctions of oscillation are produced by oscillations which move in the same direction in phase opposition at the same frequency. The oscillation energy thus is almost completely enclosed and accumulated within the porous foam plate. When several insulating groups with such porous insulating plates enveloped by reflecting aluminum foils are provided, it is possible to convert the entire sound energy safely into heat. The amplitudes of such oscillations are at least also in this case reduced to such an extent that the sound level is below the range of audability. The honeycomb ribs with the aluminum foils or, respectively the insulating groups can be pressed on both sides against the intermediate sheet metals. As a result thereof there are formed on both sides very irregularly intersecting common or nodal lines which sub-divide the entire surface of the intermediate sheet metals not only corresponding to the honeycomb surfaces, but also in a completely ungeometrical form corresponding to the incidental position of the honeycomb ribs on the one or the other side of the intermediate sheet metal. Thereby the intersecting points are under an especially high pressure and represent also completely irregularly distributed nodal points. Development of inherent oscillations or, respectively, frequencies and of harmonic vibrations or overtones which are in a simple relation thereto, is almost completely excluded. The intermediate metal plates thus acquire the property of non-sound-absorbing heavy plates, a property which belonged heretofore according to the state of the art only to very hard and at the same time massive, very heavy and thick plates and walls. This property thus is imparted in the above mentioned manner even to thin sheet metals. At the same time there can be increased in this manner the bending strength and thus the carrying capacity almost up to the yield point or flow limit corresponding to the magnitude of the pressure which acts at any time vertically upon the surfaces of such a sheet metal on both sides.

The described manner of pressing against the surface whereby irregular crossing over on both sides takes place can be evaluated so that the width of the cells, the partial surface of which, as has been explained, is further sub-divided by the nodal lines fromed from the other side, can now be made considerably larger. The contact pressure of the honeycomb ribs renders possible to achieve increased bending strength of the intermediate sheet metal due to its concentration upon a diminished total length of the lines of contact corresponding to the wide-meshed net structure or reticular structure. Production of a vacuum for generation of pressure of the wall shells upon the filling has already been described. Assuming that the structural shells or, respectively, the structural plates are absolutely resistant to bending, for instance by providing re-inforcing means, there could be exerted a uniform pressure of the structural shells upon the surface of the supporting cores arranged therebetween, especially via the bolts provided along the edge parts.

It is possible to exert, by means of bolts, thousands of kilograms of pressure per square centimeter. It is, of course, understood that such bolts can be provided not only at the edge parts but also at any desired place from wall shell to wall shell preferably with the provision of a proper packing between the wall shells through which these bolts pass, thereby sealing it air-tightly.

Convex pressing of the porous foam intermediate plates enveloped with aluminum foils into the cells can be carried out also in the following manner: The insulating groups and intermediate plates are superposed in an assembling room provided with dry air and are compressed together with each other and introduced in this manner between the structural shells.

Production of a sub-atmospheric pressure or vacuum in the cells can be achieved in an evacuatable chamber whereafter the intermediate plates and the covering layers are pressed into each other in a convex manner by means of devices to be operated from the outside.

The invention includes further variations. The packings can be provided in the form of transverse or longitudinal strips or straps similar to distance pieces or spacers in a manner resistant to bending so that the structural shells are kept at a pre-determined distance from each other when tightening the bolts passing through these packings. These transverse or longitudinal packings which are resistant to bending form nodal strips on the structural plates or shells. As a result thereof only the intermediate surfaces between the nodal strips can oscillate with respect to each other corresponding to their distance from each other. The insulating groups with the honeycomb plates and the aluminum foils closing them can be arranged at an optimum distance to the inner surfaces of the structural shells between the strips of packing without contacting said inner surfaces. Thus they have only a thermal insulating function if a vacuum exists.

If, however, air is present in the cavities of the structural element, then the conditions exist as they have been explained hereinabove. The oscillations of the sound conducting through solids are reflected or radiated as sound conducted through air from the interior of the structural shell within the range of the cavities between the packings and they contact the aluminum foil which envelopes the insulating plate. As far as they penetrate into the insulating plate through the aluminum foil, those processes take place as they have also been described hereinabove. The same processes occur also in the honeycomb cells, reflecting all over.

With respect to pressing the insulating plates into the cells on both sides in a convex manner, the depth of the cells must be kept correspondingly larger. While for thermal insulating a distance from aluminum foil to aluminum foil of about 10 mm. is to be regarded as optimum distance, the distance must be selected in the present case as of about 3 cm. to 4 cm. depending upon the width of the cells of the honeycombs whereby a free distance of about 10 mm. between the convex archings is to be maintained. The cells of the honeycomb plates are air- and vapor-tightly sealed by the reflecting foils and by the pressure which is exerted upon the structural shells, between which the honeycomb plates and the load-bearing interposed composite plates are provided. They are pressed with tension into the cells by means of the elastic or at least deformable, for instance, plastic foam plates which are arranged on the back of the reflecting foils (aluminum foils). Due to their tension they would possess, when flatly or planely positioned, an inherent frequency, i.e. a selective resonance on account of which all other frequencies or oscillations are reflected and thus cannot penetrate as sound throughout the structural element. Anyway sound oscillations are not conducted through a vacuum because they are dependent on the presence of matter.

By pressing the honeycomb ribs against the inner surfaces of the structural shells and against the interposed composite plates, the shells and the plates can also only oscillate with their inherent frequencies which are dependent upon the size and shape of the honeycomb cells through which these surfaces are subdivided into corresponding areas or sections and thus can oscillate acoustically. There inherent frequencies, however, are above the audible frequency range. Thereby it is to be taken into consideration that the inner surfaces of the shells possess also a tensile stress when they are bent or deflected. Said tensile stress would also cause selective resonance. The interposed composite plates are subdivided into irregular acoustic fields or sections by the honeycomb ribs being pressed thereon on both sides whereby formation of nodal lines is encountered. Therefore, they cannot conduct audible oscillations. Oscillating membranes are prevented to oscillate by contacting them slightly. In order to achieve sound insulation it is advantageous to select large cell diameters and to dimension the height of the honeycomb ribs so that an optimum space between opposite reflecting foils which are round or rounded under tesnion, exists inspite of the pressed rounding or camber of the tensioned reflecting foils.

Heat insulation results from the high degree of reflection (about 90%) of the aluminum foils and by excluding air convection due to evacuation of the cells. Of the heat energy which is absorbed by about 10% there is emitted towards the opposite side only about 10%, i.e., about 1% of the original energy. Thus practically almost complete heat insulation is achieved by providing reflecting foils or reflectors/reflecting means, especially also reflecting plates in multiple arrangement.

Such a structural element is protected against any penetration of water vapor due to the vapor tightness of the metal foils, metal sheets and the like as well as the shells. Any corrosion in the interior thus is excluded.

It is evident that the task of improving the bending strength as well as heat and sound insulation while at the same time preventing corrosion, is solved by the present invention in a highly effective manner.

BRIEF DESCRIPTION OF THE DRAWINGS

Various illustrative embodiments of the present invention are shown in the drawings without, of course, limiting the same thereto. Thereby reference will be had to producing a vacuum or partial vacuum or to producing excess pressure in the structural element by introduction into an evacuation or pressure housing from which, after evacuation on production of excess pressure, the structural element is removed, as well as to safety measures such as screwing together the parts of said element for maintaining said pressure conditions in the structural element.

In said drawings,

FIG. 3 is a cross section through a pressure housing with a composite structural element arranged therein for producing excess pressure within the cavity.

FIG. 5 is a modification of FIG. 3, showing the composite structural element rigidly secured vertically in the pressure housing.

DESCRIPTION OF THE PREFERRED EMBODIMENTS

Figure 1:
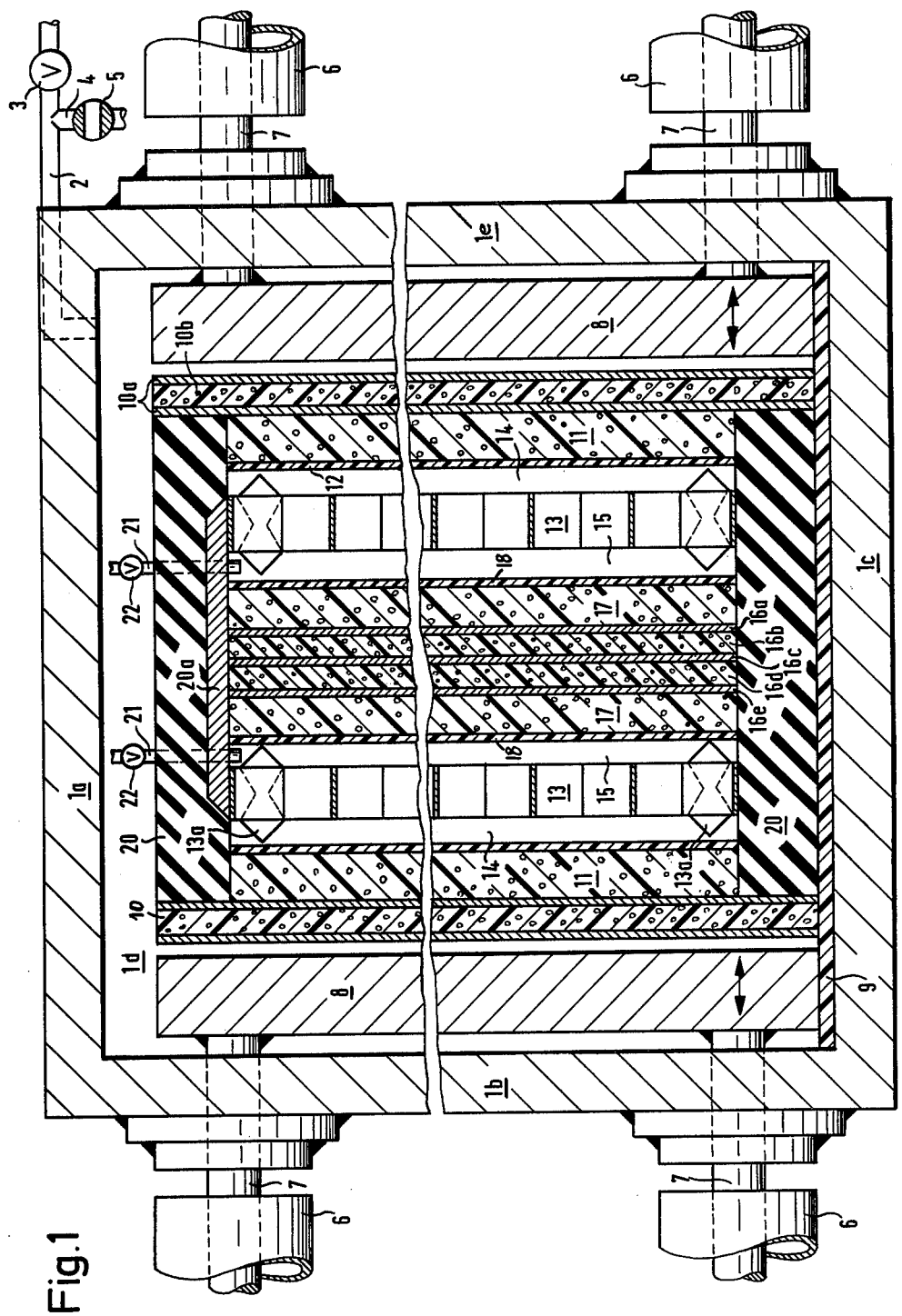
FIG. 1 is a vertical section through an evacuator housing with the required additional appliances, said housing having placed therein the composite structural-element parts arranged vertically therein which parts will be removed after evacuation and before use; said structural element being provided with a circumferentially arranged packing.

FIG. 1 shows in cross section a pressure-resistant vacuum housing 1 adapted to receive temporarily for evacuation a composite structural element in vertical arrangement of its individual parts and groups of parts.

Housing 1 is closed on all sides, except for a front opening which serves for the temporary introduction of the individual parts and groups of parts of the composite structural element. The opening can then be hermetically closed. Pipe 2 for establishing a vacuum or partial vacuum extends through the upper housing wall 1a, said pipe having an outlet valve 3 and a branch connecting it to an air pump. Pipe branch 4 containing valve 5 serves for re-introducing air, so that the evacuated structural element can be removed for use in construction.

Compressed-air cylinders 6 having pistons and piston rods 7 are arranged on side walls 1b and 1e. The piston rods are movable in airtight fashion through the walls and serve to actuate reciprocatable vertical pressure plates 8 on slide bottom 9 of housing 1.

The parts and groups of parts of the composite structural element are arranged symmetrically in the following manner within the evacuating housing 1a, 1b, 1c, 1d, and 1e only during evacuation and/ or the action of pressure.

The outer structural shells 10 are formed of composite plates consisting, for instance, of two metal plates 10a having a solid and elastic plastic intermediate layer 10b, for instance, of polyethylene (sandwich shape). The inner sides of these composite plates 10 are connected with boards 11 of compressible material, such as plastic foam boards, felt boards, rubber boards, or asbestos fiber boards, for instance, by means of layers of adhesive. The free surface of these boards or plates 11 can be coated with layer 12 which is preferably impervious to vapor. This layer can be, for instance, a metal foil preferably of aluminum, a vapor-impervious plastic foil, preferably of polythylene a layer of plastic applied in liquid form, or the like. These parts form a compact single composite group.

Between said layer 12 and a following honeycomb plate 13 there is an open air gap 14. The honeycomb plate 13 can consist of any suitable material, for instance, of metal, particularly steel or aluminum, or of plastic, or of cardboard. Instead of a honeycomb plate, some other pressure-resistant plate having suitable perforations and correspondingly remaining narrow webs can be used. This honeycomb plate 13 is followed by another open air gap 15. In order to assure and/or maintain a narrow air gap, compressible inserts 13a can be inserted in individual honeycombs, protruding slightly towards both sides. Furthermore, there is provided a composite group consisting of a central loadbearing supporting plate 16 in multiple composite from metal-plastic-metal-plastic-metal (16a, b, c, d, and e) and on both sides of said plate 16 and firmly applied thereto compressible plates or boards 17, corresponding to those described hereinabove with respect to boards 11, and coatings 18, corresponding to those described hereinabove with respect to layer 12. All the above described parts are then again provided in symmetrical sequence.

FIG. 1 shows a circumferentially arranged elastically compressible packing 20, for instance, of synthetic rubber, between the edge portions of the two outer plates 10. The upper part of the curcumferential packing is provided with pipes 21 with valves 22 through which the air which is present at atmospheric pressure in the structural element can flow out into the evacuated vacuum space. On the other hand, no air can pass from outward to inward into the structural element. A pipe or a hose connecting the structural element with an evacuating device and extending outward through a wall of vacuum housing 1 in hermetic fashion can also be provided. Packing 20 can consist of several layers, particularly of layers of different elasticity, for instance, formed in transverse direction. At least the upper part of the packing can be provided with horizontally extending insert strips of rigid material to take up pressure, said strips being inserted, for instance, in recesses of the compressible packing. On both sides of the two outer structural plates 10, the movable pressure plates 8 are provided as described hereinabove. With these pressure plates, the structural shells or panels can be replaced in vertical arrangement with respect to each other whereby the circumferential packing and the described inserts are compressed. The air gaps 14, 15 which previously served for evacuating the air from out of the composite element are eliminated. Under the high pressure applied by pressure plates 8, the elastic inserts 13a are forced back. The plastic foam boards with their vapor-impervious surface coatings, for instance, aluminum foils, are pressed hermetically into the honeycombs. In this way there is produced a firm connection between the honeycombs and the plastic foam boards. When the two outer pressure plates have reached their end position, this is also at the same time the predetermined end position of the outer structural shells and of the inserts compressed between them. If the air is then let into the vacuum housing, the atmospheric pressure will exert its action. The structural element can then be removed from the vacuum housing and can be delivered to the site of use.

As a result of eliminating the inner pressure of the air, the structural shells are moved towards each other and thus press the pressure-resistant honeycombs against the surfaces of the bearing supporting-composite 10a, 10b, and 16a, b, c, d, and e which thus, corresponding to said pressure, are held additionally in flexure-resistant fashion in vertical position. By the back-pressure of equal value acting on the inner surface of the structural shells or panels 10a, the structural shells or panels are also supported on both sides in flexure-resistant manner in addition as load-bearing elements. As a result of pressing the narrow honeycomb ribs into the elastically compressible vapor-imperviously coated sealing plates of plastic foam 11 and 17, each individual honeycomb is closed off in an air- and vapor-tight fashion. In this way the load-bearing, flexure-resistant condition of the composite element is assured. Even in the event of partial destruction of a structural shell or panel or of the edge seal, the vacuum remains in all the uninjured honeycombs and thus there also remains the support for the load-bearing composite plates 10a, 10b, and 16a, b, c, d and e. The packing 20 can therefore be completely dispensed with. The honeycomb webs or ribs can in addition be connected by adhesive with the compressible means 11, 12, and 17, 18 which close off the honeycomb openings. All composite groups and elements are combined by the atmospheric pressure into a compact tension and shear-resistant composite unit of increased resistance to bending.

Supplementing the foregoing description, it may be pointed out that the individual groups and individual elements within the structural element can be arranged in an asymmetrical fashion, for instance, from one side towards the other one, depending on varying requirements. Reasons of fire protection may also make the provision of other structural materials necessary.

Instead of providing merely one central group of load-bearing composite plates, a plurality of such or similar groups consisting of, for instance, vertically load-bearing composite elements and resilient plates connected firmly to them and inserted in the honeycombs can be provided following each other at small intervals thus having a high load-bearing capacity.

The composite structural element can also be made without packing 20 and such an element can then be introduced into the cavity of another larger structural element. The structural plates or shells of the inner structural element can thus be connected with those of said other outer element, for instance, by adhesive plastic foils or by layers of adhesive. The hollow space which then still remains free between the inner structural element and the other outer structural element can then be evacuated individually. Assurance of the load-bearing strength of such a structural element is then preferably provided by the inner structural element.

Figure 2:
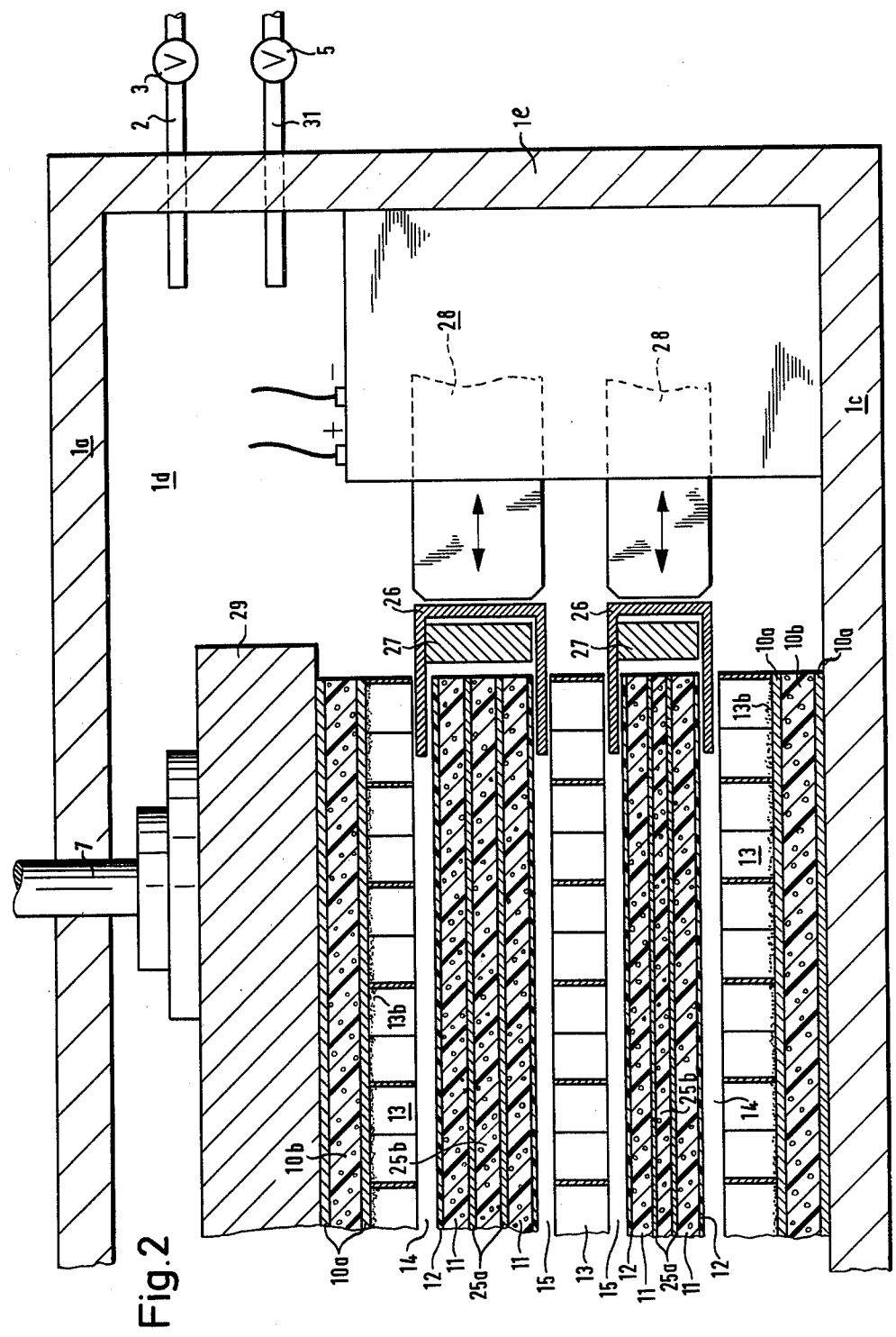
FIG. 2 is a vertical section through the right-hand portion of an evacuator housing showing the right hand parts of part of a composite structural element introduced transiently horizontally in the housing on supporting means for evacuation.

FIG. 2 shows, in a vacuum housing 1, the assembly of such a structural element in horizontal arrangement of its parts 13 and groups of parts 10a, 10b, 13, and 12, 11, 25a, 25b, 11, 12. Said structural element consists of two outer composite structural plates 10a and 10b, for instance, of two metal sheets 10a with layers of plastic 10b arranged therebetween in composite fashion and consisting, for instance, of polyethylene. The inner surfaces of the shells or panels are firmly and hermetically connected with honeycomb plates 13 by means of an adhesive 13b, for instance, of a polyurethane foam developed for this purpose. Instead of an adhesive plastic foam, any other connecting means can be used, for instance, liquid, subsequently polymerizing, sealing plastics. The honeycomb plates 13 are each followed by an air gap 14. Thereafter, a composite group is arranged, said composite group consisting of a composite sheet (sandwich type) 25a, 25b with, on both sides thereof provided compressible sealing plates 11, for instance, of plastic foam, felt, asbestos, glass fibers, or rubber. The surfaces of these sealing plates bear preferably vapor-proof foils 12, for instance, of polyethylene or metal, such as aluminum. Between these parts, at a distance established by an air gap 15, there is provided a single honeycomb plate 13, for instance, of metal, plastic, or cardboard. A plurality of honeycomb plates 13 can also be combined into a sandwich or composite unit with the interposition of other plates, such as, sealing plates 11 with foils 12 for instance, by means of adhesive plastic foam. The individual structural element parts and groups of parts are held, if required, at a distance apart of air gaps 14, 15 on the edges of fork-shaped supporting means 26 which are arranged movably on supporting ledges 27 of a supporting frame. When the air is evacuated from the vacuum housing via pipe 2 with valve 3, it is then removed in the same manner from all parts of the structural element. Thereupon, the movable supporting means 26 can be pulled out of the air gaps 14, 15 by means of electromagnets 28 and thus said parts of the structural element can move downwardly one upon the other in the position arranged precisely, for instance, on stops to their intended final position. Compressing of the parts of the composite structural element can be effected by means of pressure plate 29 which is arranged on upper structural shell or panel 10, for instance, by their weight, or by a compressed-air cylinder with piston and piston rod 7 which moves in airtight fashion through the lid 1a of the vacuum housing. In this way the individual honeycombs are hermetically sealed by the adjoining foam plates 11 being pressed thereinto. If the air is then again let into vacuum housing 1 through pipe 31, the parts will be further pressed together by the atmospheric pressure and thus all parts of the composite structural element will be combined to form a compact unit. The resulting assembled vacuum housing can then be removed from the vacuum housing and can be used as desired.

Of course, it is possible also to provide a packing between the edges of the shells or panels. In this case the parts of the structural element can be placed loosely one on top of the other up to the uppermost composite part which is borne by the packing, said packing, in turn, being received or carried at the bottom by supporting means with the formation of an air gap. Since the air in the interior of the structural element is of higher pressure than the vacuum in the housing, it flows almost completely out. For this purpose special evacuating tubes or hoses can also be arranged above or below the packing or therethrough preferably provided with valves. The packing can also be applied subsequently and the space between it and the core of the structural element can additionally be evacuated. Such an element can be used in various manners as an insert in other correspondingly larger composite structural elements. It can furthermore be combined in sandwich fashion with the inner surfaces of larger structural shells or panels of such larger composite structural elements, for instance, by means of adhesive intermediate layers, and particularly by means of adhesive foils or adhesive solid, preferably elastic plastic plates. Insofar as the arrangement of an elastic circumferential packing between the edge parts either of the larger composite structural element or of the smaller composite structural element to be introduced is necessary, evacuation of the intermediate space can be effected via pipes with valves between the packings and the parts of the structural element.

Provision of the air gaps 14, 15 and/or the arrangement of supporting means 26 and electromagnets 28 are necessary in the case of the use of lighter materials, for instance, of aluminum and cardboard honeycombing. The air present in the element parts, except for a very small amount, is forced to the outside during evacuation of the vacuum housing. If a circumferential packing is provided, it may then be necessary to produce a connection to the vacuum space 1 via a pipe with valve (see FIG. 1, reference numerals 21, 22). This pipe can also be connected with an evacuating device by passing it through the vacuum housing wall and thus will render possible evacuation of the composite structural element. Thus in case of lightweight construction, it may be sufficient to introduce a composite structural element, also with circumferential packing, provided with an evacuator pipe and valve mounted into a vacuum housing in order to evacuate it by elimination of the atmospheric pressure. Thus composite structural elements of heavy individual composite elements and groups of elements can be evacuated in this way via pipes with valves. When using packings, pressure plate 29 may also be dispensed with upon insertion or interspersing of pipes with valves. In all cases the means described permit complete or practically complete evacuation of the air, as required.

The introduction of evacuated smaller structural elements achieves its importance through the possibility of imparting to the load bearing supporting elements contained in the evacuated structural element especially if they are formed of composite plates in a single or multiple bonded arrangement (multisandwich type) or in multiple group arrangement, a practically unlimited increase in resistance to flexure on the structural shells or panels of the inner smaller structural element due to the positive pressure that can be produced in another larger structural element. In this connection the outer structural shells or panels of at least the smaller structural element can also be developed as load-bearing supporting plates. Under the positive pressure which is exerted on their outer surfaces on the one hand, and the correspondingly high back pressure which is exerted on their inner sides, said shells or panels are supported with corresponding flexural resistance to receive the loads or other pressures in the direction of their plane. For this purpose the outer structural shells or panels of the other larger surrounding composite structural element must be able to take up, with resistance to compression and bending, by suitable structural development, the excess pressure present in the cavities. This can be effected, for instance, by the provision of intersecting profiled sheets, and particularly of trapezoidal sheets, the contacting points of intersection of which are welded together in multiple layer. A further increase in the bending strength of such combined shaped, and particularly trapezoidal, structural shells and panels can be obtained in a manner that profiling is effected on composite sheets, consisting, for instance, of metal-plastic-metal (sandwich-shape). Or the trapezoidally shaped or differently shaped sheets are first of all connected in this form with solid preferably elastic plastics of corresponding shape to form profiled composite sheets (sandwich-type) which are then firmly connected with each other in a singly or, respectively, multiply intersecting sequence. Such profiled structural shells or panels can be developed by means of sheets which are closed on all sides to form an airtight and liquid-tight hollow body which, for instance, can receive plastic foams or any other substances, liquids, or gases serving the purposes of the structural element.

FIG. 3 refers to the advantages of the use of positive pressure in a composite structural element. FIG. 3 shows diagrammatically in cross-sectional view a composite structural element with horizontal arrangement of the individual parts which are inserted in a pressure-proof pressure housing 40a, 40b, 40c, 40d and 40e for producing various pressure conditions.

The composite structural element consists of outer structural shells or panels 41 which are made from intercombined, connected trapezoidal sheets 41a, 41b, and of circumferentially extending side walls 42 and 43 arranged hermetically sealed thereon and parallel to each other, said side walls being of lesser width than the distance between the structural shells or panels. The edges of these side walls are pressed into circumferential elastic packings 44 and 45 associated therewith. In this way the hollow space between the structural shells is closed off elastically with variable air-tightness and imperviousness to vapor. So as to further assure air-tightness, a third circumferential packing 46 can be provided between the edge parts 47 and 48 of the two structural shells or panels 41.

Within the hollow space, approximately in the center, there is provided a pre-evacuated composite structural element consisting of at least two structural shells or panels 51, 52, preferably of composite sheets, and of one or more honeycomb plates 53, and load-supporting flexure-resistant composite supporting plates 54 arranged between the latter. This inner structural element which is pre-evacuated bears on the outer surfaces of its structural shells or panels a compressible layer 55, for instance, of rubber, plastic, or plastic foam. On both sides of these surfaces 55 there are arranged honeycomb plates 56, for instance, of steel plate, which before assembling the outer structural element have been fastened hermetically to the inner sides of its structural shells or panels 41, for instance, by means of adhesive polyurethane foam 56a or liquid plastic adhesive. Thus the air can possibly enter the honeycomb plates only along the outer surfaces 55 of the inner wall element.

Pipe 57 or the like having a valve 57a is arranged towards the cavity of the composite structural element. Via said pipe 57 it is possible to introduce compressed air through a compressed air device into said hollow space with any required degree of pressure. The outer structural shells or panels 41 are pressed by means of said compressed air so far apart against stops (not shown) that between the inner structural element and the adjoining honeycomb plates there is formed a fine air gap 58 by which each individual honeycomb is provided with compressed air to the extent contemplated. Thereupon, compressed air of a higher pressure than the positive pressure in the inner structural element is introduced into the hollow space of the pressure housing 40 by means of an air compression device via pipe 60 with valve 61. Thereby the structural shells or panels 41 of the outer element are pressed against each other so that the air gaps 58 are closed and the webs or ribs of the steel honeycombs 56 are pressed into the compressible layers 55 or plates on the outer surfaces of the structural shells or panels of the inner element in an air-tight and vapor-tight manner. Thus there prevails within the hollow space of the composite structural element a counter-pressure which corresponds to the positive pressure exerted in the hollow space of the pressure housing. In order to maintain this desired pressure condition, by which the surfaces of the bearing supporting means 51, 52, 54 are propped or braced, in particular by the honeycomb plates 53, 56, up to the increased bending strength corresponding to the positive pressure, after elimination of the pressure in the pressure housing 40, there are arranged along the narrow sides of the outer structural element means for fixing the minimum distance between the outer composite structural shells or panels 41 as it is obtained by the external positive pressure. FIG. 3 shows detent or stop means, i.e. engagement means for this purpose, on the structural shells or panels, such as protruding ledge-shaped parts 66 of the upper structural shell or panel 41, and other associated parts as well as the detent or stop ledges 67 with spring-loaded, movable detent or stop elements 68 which can be inserted into the detent or stop strips 67 and which snap behind the mating ledges 66 protruding on the upper structural shell or panel when said structural shells or panels 41 are moved towards each other. In this way the intended position of the structural shells with respect to each other which is thus obtained is fixed or locked in position and secured permanently.

In this connection the lower part of the detent or stop strip is in engagement with a rectangular strip-shaped bend 69 of the lower outer structural shell or panel 41a and thus prevents the detent or stop strip 67 from changing the compressed position of the upper structural shell or panel 41 secured by its detent or stop element 68 by engagement after elimination of the outer positive pressure. In order to prevent lateral forcing away of the detent or stop ledges 67, said ledges are pressed movably by strong tension springs 70 in the direction towards the detent or stop ledges 66. Of course, means by which it is possible, if necessary, to effect a disengagement can also be provided, for instance, by drawing back the detent or stop ledges 67 by means of an electromagnet. The detent or stop means described are merely one technical possibility among many others of achieving the same goal.

Figure 3B:
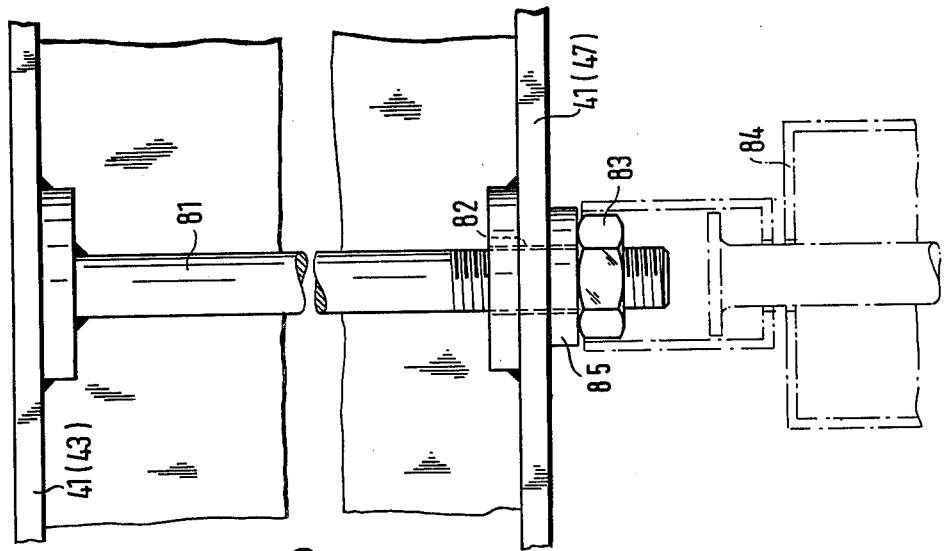
FIG. 3b shows a bolt which is fastened on the inside of one of the two facing structural shells or panels and which, in the condition in which the shells or panels are at the slightest distance apart is locked in said position by pressure in the pressure housing with associated machines which effect screwing.
Figure 3A:
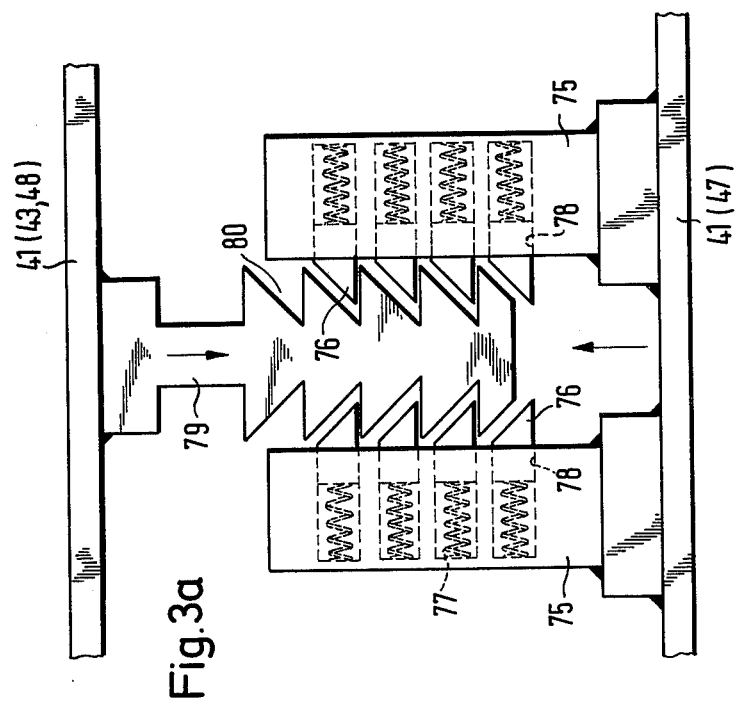
FIG. 3a shows engagement means for connecting the structural-shell surfaces which together with packings define a cavity of the composite structural element, parts of which are under pressure.

FIG. 3a shows schematically in cross section, supplementing FIG. 3, one possibility of connecting the surfaces of the two structural shells or panels 41 for instance, by detent or stop means in the end position imparted to them in the pressure housing, for an unlimited period of time. For this purpose there are welded onto the inner side of the lower structural shell or panel 41 two correspondingly large square pipes 75. Detent or stop elements 76 are inserted against the action of compression springs 77 between universal guides 78 in said pipes. Said detent or stop elements 76 propel and can be pushed in to an extent which is limited by stops. They are provided with backwardly extending bevels. The distance between the two detent or stop element carriers 75 is such that said elements snap and engage into solid body 79 which is welded to the inside of the opposite structural shell or panel 41 and which is provided with incisions 80 corresponding to the triangular shape of the detent or stop elements 76 and their distances apart from each other, under spring pressure 77 upon a corresponding change in position, i.e. reduction of the distance between the structural shells or panels. Thus they permit further movement up to the end position only in direction towards a reduction of the distance between the structural shells or panels.

Such means which connect the inner surfaces permanently against the inner positive pressure can be arranged in any required number at suitable places of the surfaces 41. They can also be provided in the form of longer strips. The inserts and supporting plates are to be recessed at the respective places or they are to be provided with slits or interposed slot spacings.

FIG. 3b shows another embodiment for connecting the composite structural surfaces 41 with each other at the minimum distance attained by the positive pressure. For this purpose bolt 81 is welded onto the inner side of the cavity of the one structural shell or panel 41, said bolt passing through a hermetically closed bore hole 82 in the opposite structural shell or panel 41 and being adapted to be tightened by nut 83 on the outer side thereof. Said tightening must be effected in the pressure space at the maximum pressure established. For this purpose screwing machines 84 connected to be operated electrically from the outside are arranged precisely with respect to the position of the nuts. In this way the structural shells or panels are connected with each other at least at a minimum distance apart attained by the positive pressure, i.e. under the condition of the highest pressing tension of the pressing means 51, 52, 53 with respect to the load-bearing supporting plates 54, so that after releasing the positive pressure air from pressure housing 41 for removal of the structural element therefrom, the condition of stress in the evacuated structural element remains unchanged.

The described interconnecting means of the outer structural shells or panels exert an opposing pull or countermove with respect to the compressive forces which otherwise would cause bulging the outer structural shells or panels towards the outside and bending in of the same. These connecting means thus render possible to correspondingly increase the bending strength of the inner bearing supporting elements.

Figure 4:
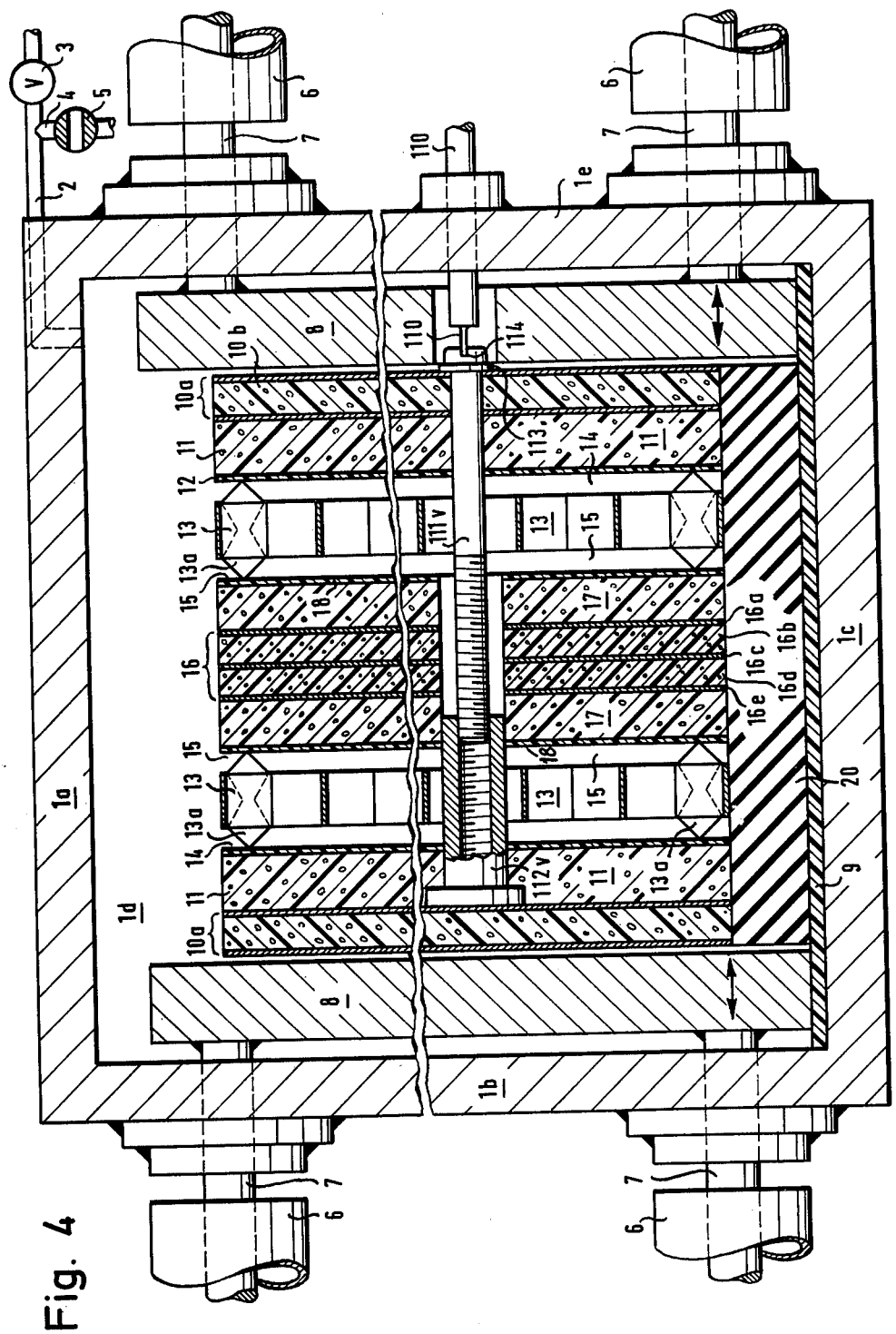
FIG. 4 is a modification of FIG. 1, showing the composite structural element parts rigidly horizontally connected.

Referring to the modified form of the invention shown in FIG. 4, in which previously described elements as illustrated in FIG. 1 are designated by the same reference numerals, plates 11 may consist e.g., of solid plastic material, or they may be vertical trapezoid plates 10a, e.g., of metal which are rigidly connected with the adjacent plates. Instead of foils 12, rigid plates, especially metal sheet plates, may be employed, which, e.g. are welded together with the trapezoidal plate and are preferably universally sealed in an airtight manner. The same structure as provided for plates 11 and layer 12 is applied to plates 17 and layers 18, which are preferably also metal sheets. The packing 20 and 20a can be eliminated. The welding of the metal honeycombs 13, e.g. steel honeycombs, together with the adjacent sheet metal plates 12 and 18 is carried out, as described, by pressure and resistance and/or electronic (electric arc) welding, preferably in a vacuum, for which purpose the honeycomb plates 13 and the plates 12 and 18 are connected to opposite poles of a welding machine. The metal sheets 12 and 18 and the joint elements, as described above are prepared or shaped depending on the type of welding applied to them. Especially suitable means for holding the evacuated structural element together are tightening screws or clamp bolts.

These screw means are illustrated more in detail in FIG. 4. Bolt 111v is threadedly received in sleeve 112v mounted in the structural element. Said bolt 111v passes throughout the entire structural element and rests or abuts against said element by means of disc or sleeve 113. Adjusting screw driverlike means 110 engage slit or sleeve 114. Said means 110 pass through the wall 1e of the evacuating housing. This device permits to press together the evacuated structural element in the evacuating housing. After removing the compressed evacuated structural element from said housing, its pressure condition, i.e., the vacuum is retained. Such tightening bolts 111v with their sleeves or nuts 112v can be provided, as required, at any place of the main surfaces of the structural shells and/or their edge portions. Due thereto the state of stress in the structural element can be increased additionally and can be maintained. More in particular tensioning of the shells or panels can be carried out in such a manner that they are bent against each other with the deepest deflection preferably towards the point of intersection of its assumed plane diagonal. As a result thereof the shells or panels are maintained to an increased extent resistant to bending and breaking when continually exposed to load parallel to their surfaces at a correspondingly increased counter pressure of the supporting and spacing means in the cavity or hollow space. In connection therewith the interior of the cavity or hollow space can be further equipped, if required, more or less with further supporting means. Or it may be provided with only a few spacing means, preferably in combination with the tightening screw or clamp bolts.

Due to the tension to which the shell is exposed and to the vacuum there is achieved a high sound insulation which can further be improved by additional means provided in the hollow space or cavity and tensioned with their inherent frequency. The highly reflecting foils and/or sheets can have a sound insulating capacity not only due to their tension but they also are capable or reducing very considerably transmission of heat energy due to their property as reflecting means. Instead of compressible insert or spacer elements, pressure springs for securing airgaps 14 and 15 may, for instance, be inserted. The valves 21,22 are dispensed with in the FIG. 4 form of the invention in which the packing 20 is eliminated. The welding machines may be arranged outside the welding space, and the feeder cable may be guided through the space walls in an airtight manner into the evacuating housing.

The modification described with reference to FIG. 4, according to which the plastic material foam plates 11 were replaced, e.g., by plastic material plates or shaped metal plates, e.g. trapezoid plates, applied also to FIG. 2; this applies also to a multiple, preferably crosswise arrangement with air-tightly sealed metal sheets inserted by welding and for transverse subdivisions which form airtight chambers. In place of foils 12 metal sheet plates or composite plates may be provided. Furthermore, the honeycomb plates or the like are connected, extending in a direction opposite to the adjacent plates, to the poles of the welding machines, and then the welding is carried out under the pressure of plate 29. Forks 26 are made of, or covered with, insulating material.

The pressure plate 29 may also be constructed as electromagnet plate and support magnetically at least the uppermost portion of the construction element. It may also be arranged resiliently so as to exert a specific elastic prespecified welding pressure.

Referring to the FIG. 5 modification, in which previously described elements are illustrated by the same reference numerals, the internal construction element 52, 53, 54, the same may be modified as explained above with respect to the modifications relating to FIGS. 1 and 2. The internal evacuated construction element may be an element rigidly welded to a unit and consisting e.g. of steel honeycombs, steel cover sheets with shaped plates, inserted by welding between such cover sheets, e.g., corrugated plates, trapezoid plates, especially with crosswise sequence with intermediate plates and transverse subdivisions for the formation of airtight cells or chambers. The trapezoid building shells 41a and 41b may also be constructed with intermediate plates and chamber subdivisions in an airtight manner, and with vacuum. The welding together with the honeycombs 56 provided with excess pressure can be carried out as described above. The compressed air pipe 57 can be removed at any time. The sealing 44 is provided with small slit. When the pipe is being removed, the slit closes in a airtight manner.

In the FIG. 5 form of the invention, the shells or panels 41 are connected to each other at a minimum distance attained by the positive pressure as described by means of a bolt 120 which is secured at one end to nut 121 secured to one panel and which extends at its other end through the other panel 41, through disc 123 for the desired tightening by nut 122 which engages the exposed end of the bolt.

Basically, in all cases suction and pressure pipes can be arranged in such a way that they are detachable through slits in the sealings or through bipartite sealings and they can be removed again, whereafter the slits close in an airtight manner under the pressure exerted upon the sealings.

The invention can be made use of in a multi-shell or multi-panel composite element in such a manner that the outer structural shells or panels are fixed in position and the inner intermediate shells or panels are arranged movable. Every two movable inner intermediate structural shells or panels define a cavity into which compressed air is introduced. In this way the distance between the two displaceable structural shells or panels is increased and the pressure on the cavity inserts of the inner structural element which are placed under tension, is correspondingly increased. In order to maintain this pressure, after the intended maximum distance of said two movable structural shells or panels has been obtained, a rapidly hardening liquid structural material can be introduced into said pressure space under an even greater pressure. In order to be able to introduce the compressed air which is to be displaced by this liquid structural material without loss of pressure, an outlet valve can be arranged in the upper air-space apart, said valve making it possible that when a predetermined pressure is exceeded, the compressed air is allowed to flow out as from said predetermined degree of pressure. In this way it is also possible permanently to fix the predetermined optimum pressure-tension condition.

At the same time it is possible to span with great forces ceiling and floor parts (or upper and lower parts) of structural elements, for instance, for bridges with such displaceable outer shells or panels and non-displaceable outer shells or panels facing each other in a pressure cavity of the structural element. For this purpose a movable structural shell or panel can then be arranged against following pressure means and load-bearing supporting means on each of the two non-displaceable outer shells or panels at a slight distance so as to form a pressure cavity. This arrangement can be effected, for instance, for bridges in recurring sequence as necessary for increased tension or span of upper and lower part.

It is also conceivable to provide in a pressure cavity of a structural element, for subdividing thereof, a plurality of air hoses with individual valves to establish the intended pressure in them. Upon damage to the pressure cavity, the undamaged hoses continue to exert their pressure action. Extremely high compressive stresses can be exerted by applying a corresponding positive pressure within such a constructed structural element having non-shiftable outer structural shells at least on both sides via one or more hermetically arranged structural shells or panels arranged shiftable in the inside, on the load-bearing supporting means associated with them. The connecting upper cover or ceiling part and lower bottom or floor parts can be tautly tensioned in this manner.

The composite structural element forms a single composite unit from a static standpoint. For this reason, the connections between the core and the outer plates and at least the intermediate shells or panels must be so firm that the shear stresses transmitted to the boundary surfaces are taken up by the outer plates or intermediate shells or panels without said plates and panels becoming loose. For this purpose the outer plates and/or shells or panels are to be constructed with a sufficient minimum strength as well as a sufficient minimum flexural strength.

The load-bearing supporting plates can be placed under compressive stress in various manners. Thus the compressive stress can be also produced by liquids which are placed under compressive stress. Water of high pressure can be introduced into a hollow chamber of the structural element and a vacuum can be present in an adjoining hollow chamber, or water with the normal pressure determined by the atmospheric pressure can be introduced. Such pressures can be exerted also purely mechanically, for instance, by lever actions against a plate or shell (panel) to be displaced, or, for instance, via a compressed air cylinder with piston rods against a displaceable shell (panel), or, as described above, by tightening screws or clamp bolts.

It is sufficient to effect this pressure action only from one side and to have the counter-pressure which is exerted via a stationary shell (panel) on the load-bearing support, act on the other surface of the load-bearing supporting means. Nevertheless it is advantageous for reasons of safety to have the pressure action exerted from both sides should the pressing force fail to act on one of the two shells (panels). To achieve this result, it is advisable to keep as small as possible the distance between the movable shell (panel) exerting the pressing force and a pressure-resistant stationary wall associated with it. Should then a failure occur, the required pressure will be produced by the other movable displaceable shell (panel) and the full bending strength of the load-bearing supporting means will be retained by the opposite force of the stationary wall, without any reduction in force. It is furthermore advisable to fill the hollow space between said shells or panels with honeycomb plates up to a minimum gas of less than one millimeter.

The use of honeycomb plates for use in the pressing step differs from the use of flat plates. In the case of flat plates, the pressing pressure is distributed uniformly over the entire area of the pressing plate. In the case of a honeycomb plate, however, only the very narrow ribs of the honeycombs transmit the entire pressure. These ribs as a rule can take up less than 1% of the surface to be pressed. This means that the total pressure which is exerted on the honeycomb plate is transmitted by these ribs with more than hundred times the force to the lines of the surfaces to be pressed which are contacted by them. It follows that a corresponding stress structure results from said pressing lines. The free space between the ribs of the honeycombs is subjected, on the other hand, to flexural forces.

Therefore, the honeycomb surfaces must be in a specific, size ratio with respect to the bending strength of the plate to be supported, on the one hand, and to the load borne by the load-bearing supporting plate, on the other hand, in order to prevent bulging or bending in or kinking of the load-bearing supporting plate. It is advantageous to provide for optimum widths of the honeycombs with a relatively small size of the honeycomb ribs in order to increase as much as possible concentration of the energy of the respective lines corresponding to the honeycomb structure. In combination with the relatively small height of the honeycomb ribs they should also be made as resistant as possible to bending, for instance, by the use of steel sheets.

The honeycombs in the stress cavity which receives the load-bearing supports can be filled, for instance, with plastic foam for reasons of insulation as well as to support the honeycomb ribs against bending in or kinking. In this connection, however, said fillings should not rest, or they should rest without pressure, against the surfaces of the supporting plates.

Instead of honeycombs, it is also possible to use grids which are subdivided in the corresponding optimum grid fields and which have knife-thin edges at the place of contact with the load-bearing supporting plates. On the other hand, it is advantageous to provide a flat shape on the pressing side.

When using the composite structural elements in the building of houses the construction of multi-shell (multi-panel) composite structural ements, and at least a three-shell (three-panel) structural element is of advantage. The third shell (panel) of such an element at the same time forms the inner wall of a room of the building. A hollow space which in particular must satisfy the fire protection requirements should be provided between said third shell (panel) and the central intermediate structural shell (panel) arranged in front thereof.

In order to exclude collection of water of condensation as a result of the penetration of water vapor, the hollow space must be closed off in vapor-tight fashion on all sides. This can be done in the manner that all non-metallic wall parts of the hollow space are covered, for instance, with aluminum foil or a vapor-impervious polyethylene plastic foil. In addition thereto there is the further problem of preventing the stresses on the hollow space walls resulting from variations in pressure caused by temperature variations in the hollow space. For this purpose the invention contemplates connecting the hollow space by a pipe with the atmosphere. In this way the result is obtained that the pressure in the hollow space always agrees with the variations of pressure in the atmosphere. In order to prevent penetration of atmospheric moisture into the hollow space, the pipe can be hermetically provided towards the hollow space with a flexible air bag formed, for instance, of plastic foil. This air bag can be provided with spring spreading means by which a necessary minimum of its fillable volume is filled with outer air. If the pressure of the atmosphere increases, then this air bag is additionally filled with air, while if the pressure of the atmosphere decreases, air is given off to the outside by the air bag. In this way the hollow space remains closed in vapor-tight fashion from the outside without it being possible for stresses to occur.

Particularly when the inner wall of the room consists of a thin shell or panel of structural material, for instance, a plaster wall or a ceramic wall, it is necessary to support said wall. This can be done by a sheet metal wall which at the same time forms the structural shell or panel towards the inner cavity of the structural element. Such a sheet metal shell or panel can hermetically close off a hollow space in trapezoid-like fashion, if necessary; by two intersecting trapezoidal sheets or panels and can be constructed in the other direction so as to enclose the plaster wall on all sides. The hollow spaces resulting from the trapezoidal profiles towards the plaster wall can also be constructed in an air-tight and liquid-tight fashion and can be filled with fire-retarding materials, for instance, with a suitable form of asbestos. Other agents, for instance, rock wool, glass, fibers, and the like can also be used for this purpose. Above these trapezoidal intermediate space and the plaster wall there is arranged a water-bearing pipe with thermostatically controlled openings directed towards the rear surface of the plaster wall. If the heat of the fire reaches in case of a fire the thermostats at a predetermined temperature, for instance, through small openings in the upper part of the plaster wall, then the water pours out against the rear of the plaster wall and at the same time enters the said cavities which are formed by the trapezoidal depressions. Thereby it permeates the asbestos filling and/or the other solid fillings, for instance, rock wool, which are provided therein, and wets the absorptive rear side of the plaster wall.

The latter can be provided with bore holes through which the water passes to the front side and trickles down in the form of a curtain of water. In ths way the plaster wall will be cooled continuously and the heat of the fire will be reduced by the conversion of the water into steam. The steam displaces to an extent corresponding to its generation the oxygen-containing air and can thus increasingly exert an extinguishing action on the source of the fire. A water pipe having openings directed towards the front surface of the plaster wall and controlled by thermostats can also be provided on the front surface of the plaster wall. Such a water curtain prevents the heat of the fire penetrating via the plaster wall into the composite structural element. In this way considerable conventional fire-protection structural measures can be eliminated and saved. A further increased fire protection can be effected by applying to the front plaster wall a carbonate layer and the water, before it flows into the perforated pipes forming the water curtain, is conducted through a container in which there are contained dissolved or soluble agents which react chemically with the carbonates on the plaster wall so as to liberate carbon dioxide therefrom. Providing such containers of the aforementioned pipes is possible above the customarily suspended ceilings without great expense. The carbon dioxide displaces the oxygen-containing air and extinguishes the flames.

The liquid-proof depressions in the trapezoidal structural shells or panels can be filled with hot water from a heating system for room heating or cooling. The fire protection described can be obtained in the same manner through openings towards the plaster wall.

If a flat structural shell or panel is used, a correspondingly thicker plaster wall can be provided on its rear, for instance, with vertical, undulated profilings to form hollow spaces. This rear side, for instance, can have pasted on a plastic foil, such as a polyethylene foil, so as to achieve a water-proof and steam-proof closure. In case of fire, this foil melts at about 150° C. and, when molten, allows the water to penetrate into the absorbent plaster wall. All the other protective measures described hereinabove can also be provided.

The supporting elements produced in accordance with the present invention may be of any suitable shape.

Such supports can consist, for instance, of longitudinally slip pipes which are arranged concentrically in an unslit pipe. The pipes or, respectively, the pipe intermediate spaces can be closed at their ends in an air-tight and/or vapor-tight manner and can be sealed elastically. Thereby the sealings are effected in such a manner that changes in the diameter of the concentrically arranged slit pipes which occur when the pipes are under pressure, are taken into account and the seals are not endangered thereby. Furthermore, all seals can be reinforced and secured by elastic plastic foams. The inner equipment of the pipes for their construction as supports is in principle, aside from their round shape, the same as in the case of the square composite structural element. In order to effect compressive stresses, a change of the slotted pipes by changing their diameter is necessary in the same way as a change in position of the structural shells or panels is required in the case of the structural elements. The longitudinal slits in the pipes are responsible for said change. Due to said slits a change in the diameter of the individual slit pipes takes place under the pressure of intermediately arranged pressure means, for instance, by means of compressed air or liquid under pressure on the inside or the outside of the intermediate load-bearing supporting pipe.

First of all it is necessary to seal the slits elastically so as to prevent the compressed air penetrating into adjacent concentric spaces. Such seals can be effected, for instance, by elastic packing inserts in the slit perpendicular to the pipe surfaces. If a higher pressure is exerted on the slit pipe in the direction from the outside towards the inside, the edges of the slits will be pressed against the elastic packing and thus will reinforce the seal. The entire region of the slitting of a pipe is supported and sealed with elastic sealing means.

The edges of the slits themselves can be deformed. Thus, they can be pressed flat for sealing, for instance, by rectangular bending, against the sealing means provided between them. The bendings can also be connected with bolts which pass through the packings just as in the case of the structural element. They can also be bent by 180° C. The bend can be provided with elastic sealing means and can be in engagement with each other.

The intermediate spaces between every two pipes can, for instance, be formed as follows:

Air-tight sealing strips, for instance, rubber strips can be bonded over the pipe slits on one or both sides so as to cover the slit. Thereupon pressing means, in particular, for instance, circular honeycomb plates, preferably also slit, consisting, for instance, of metal, plastic, or cardboard, can be arranged in one or more layers so as to fill up the intermediate space approximately. It is advantageous to use honeycomb plates having relatively low ribs in order to achieve the best possible flexural strength of the ribs. Otherwise all that has already been stated with regard to the honeycomb plates, applies to the structural elements. In the case of a plurality of honeycomb plates, for instance, lighter slit pipes of the same or different material can be arranged behind every honeycomb plate in order to air-tightly subdivide the space and to transmit pressure to the next following honeycomb plate. For static reasons, it is necessary to connect all inserts firmly to each other in order to be able to expose them to tension, compression, and shear load.

The spaces between two concentric pipes correspond in their function to the hollow spaces of the composite structural element. As in that case, the adjoining structural shells or panels are partly nondisplaceable in position and partly displaceable. The slit pipes correspond to the displaceable structural shells or panels of the structural element. Thus numerous different possible combinations are available.

All the spaces can be provided with pipelines with valves so as to apply in each case in accordance with the desired combination, for instance, a vacuum to the one hermetically closed space and pressure to the two adjacent spaces. In this example, the two pipes which limit the vacuum space are slit and these slit pipes are pressed together or, respectively, reduced in diameter by the compressed air in the adjacent spaces. In this manner there is achieved a change in position by which increased resistance to bending and thus increased load-bearing capacity is imparted thereto by pressure and counter-pressure from the inside. Instead of producing a vacuum in the intermediate space in this example, atmospheric pressure can, for instance, prevail therein and the excess pressure in the adjacent spaces can be maintained one atmosphere higher, whereby the same supporting effect is obtained For instance, all pipes, with the exception of the outer pipe, can be slit pipes which are concentrically arranged one within the other with intermediate spaces. In this example, compressed air can be introduced into the cylindrical space to the innermost slit pipe. In this way the diameter of this pipe is increased, whereby a corresponding pressure is exerted on the pressing means, for instance, on circular honeycomb plates (which are also slit) in the direction towards the outer pipe over all intermediate slit pipes and pressing plates. The outer pipe, for instance, as a solid pipe, must take up the entire pressure which is exerted on its inner wall and must be able to respond as counter-pressure. For this purpose, pressure-resistant rings can be placed at suitable distances around the outer pipe. In the latter case, the outer pipe can appropriately be constructed as slit pipe.

According to another example, the excess pressure can originate from the intermediate space which is defined by the outer pipe, on the one hand, and from the cylindrical cavity of the innermost slit pipe, on the other hand, so that all pipes lying concentrically therebetween are supported in flexure-resistant fashion from both sides by the pressing means.

By an annular reinforcement of the outermost pipe, it represents also a load-bearing supporting pipe which is propped or braced with increased resistance to bending from the inside, on the one hand, by the pressing means acting thereon and, on the other hand, by the counterpressure originating from the rings. The rings can also be split, bent, and provided with tightening screws or clamp bolts.

In the same way as in the case of a structural element, it is of advantage to hermetically seal at least each of the honeycombs, chambers, or the like of the pressing means in order not to impair the flexural strength of the pipe supports in case one pipe is damaged. To achieve this result, the procedure is the same as described hereinabove with respect to the composite structural elements.

The grid-like pressing by means of the honeycomb ribs produces the same result of concentrating the pressing forces on the lines on contact. It follows that such pipe supports differ only in shape from the rectangular composite structural elements or supports. The pipes can be constructed in sandwich fashion in order to increase their resistance to bending. In place of circular honeycombs, there can be arranged corrugated plates as pressing means in the intermediate spaces. Said corrugated plates are preferably subdivided in transverse direction into a large number of small compartments each of which can be hermetically sealed off. The connecting means and other means for maintaining an optimum supporting pressure produced by temporary excess pressure can be employed in a fashion similar to that described with respect to the structural elements. Furthermore, for instance, a predetermined excess pressure in the cylindrical hollow space defined by the innermost slit pipe can be maintained permanently and thus without change by the introduction of a hardenable liquid structural material, for instance, of concrete. The compressed air should be also preferably be dehumidified by means of drying agents to such an extent that water of condensation cannot form in the hollow spaces of the pipes.

Supplementing the above statements, it is pointed out that the honeycombs or grid plates, depending on requirements, can be constructed in a specific way so that their material strength and bending resistance are increased. Thus, e.g., in the case of high compression or load stresses, it is advantageous for the purpose of increasing the strength and achieving a high bending resistance, to manufacture grid plates from pieces of square pipes with inserted plane intermediate bands (extending horizontally or vertically) to which the square pipe pieces are welded and/or cemented. The square openings may be jointed to a rigid compound unit, toward both sides, with adjacent building plates, as described above, by welding. Such compound plates present an extremely increasable strength and bending resistance due to the square shape and the welding together of all parts, as well as the selection of the materials and material strength. When such a plate is subjected, as a core plate with relation to supporting building shells or compound building shells, to tension by means of a pressure exerted from the outside, not only the building plates abutting to the said plate present an increased bending resistance but the plate itself is given a high supporting capacity (bearing strength). The material thicknesses of the square pipes must correspond to requirements, and likewise the intermediate bands connected with the said square pipes horizontally or vertically.

As already mentioned, it is also feasible to provide plastic material plates for the manufacture of core plates with chambers, cells, or the like. Thus, e.g. metal honeycombs or grid plates can be heated, preferably by electric means, to a suitable temperature and can be pressed by means of pressure plates against plastic plates arranged at both sides of the honeycomb plates. In this process, the metal honeycombs penetrate the cover plates or building plates of plastic material, due to their plastic melting temperature down to the depth required in each case, by the prespecified pressure of the pressure plates. By this process the individual chambers, cells, honeycombs, or the like, are sealed against each other in an airtight manner, and e.g., a vacuum is maintained therein.

For producing a vacuum inside a construction element numerous possibilities exist. The screws by which the edge portions of the building shells, with insertion of elastic sealings, are connected, are first screwed in only to the point where an airtight sealing takes place. Thus they can maintain the edge portions of rigidly shaped building shells and thereby the larger distance thereof from each other for the purpose of air evacuation. After the evacuation has been carried out, the screws are screwed inward by screwing machines to their terminal positions.

It is also possible to produce in such a way that, as a device additional to the edge portions of the building plates and also, e.g., of an inserted building plate, which like the external building plates is arranged at the screws with sealings, on both sides of each edge portion, nuts or check nuts are provided by means of which the position of the edge portions at the required distances from each other is maintained by changing the position of these nuts with respect to each other. The sealings seal in this process all parts which respect to each other toward the outside in an airtight manner. Through slits in the sealings suction pipes may be introduced by means of which the air is evacuated by way of valves or stopcocks by means of a suction pump, from the construction element. Then the suction pipes are pulled out from the slits, in which process the slits are sealed in an airtight manner under the pressure which is exerted upon the sealings. The screws or nuts can then mechanically be brought back to their terminal position by corresponding tightening.

In a similar manner screws may also be arranged inside the construction element between the building shells. The end of such a screw is welded to the inside, e.g., of the front wall building shell. A screw sleeve with internal threads engages the external threads thereof. This screw sleeve bears a screwhead which is provided at the external surface of the other external shell for the purpose of actuating the screw sleeve. At the end of the screw sleeve, e.g., a disc is fastened which, e.g. bears an elastic spacer toward a middle building shell or abuts directly against the middle building shell.

A second disc, having an elastic spacer arranged on the sleeve with respect to the disc may be provided.

When the screwhead is actuated the distance between the building shells can thus be increased or decreased. This makes it possible to separate the three building shells from each other to such an extent that between the honeycomb plates and the building shells any amount of free space for evacuating the air in the building element exists. After the evacuation the edge screws as well as the sleeve screws arranged with relation to the surfaces are tightened, and thus the honeycomb plates, wherein, e.g., a vacuum exists, are sealed against each other in an airtight manner.

The evacuation of the air can also be made possible in such a manner that the atmospheric air pressure exerted upon the external building shells is lifted off therefrom. For this purpose, box-type building shells with rigid, stiffened surfaces, resisting the atmospheric pressure, and sealings, extending circularly along the periphery, are arranged as an additional detachable device, at the screws with which the building shells are connected. Then the additional hollow spaces thus formed are evacuated, in which process the atmospheric pressure cannot affect the construction element but is absorbed by the edge screws that extend circularly around the construction element. The hollow of the building element is then evacuated, preferably by means of suction pipes, detachably inserted in slits or the like, with valves and stopcocks, whereafter the additional external box-shaped building shells are, through pipes and stopcocks provided thereon, again filled with air, and the atmospheric pressure can act upon the external building shells of the construction element. All elements are pressed together by the pressure and possibly by adhesive layers applied shortly before this process, to a rigid compound unit which is capable of offering the required resistance to the prespecifiable pushing forces. Then the suction pipes are removed from the edge sealings. The slits or the like in the sealings are closed in an airtight manner by the pressure which prevails in the sealings. These slits can, in addition, be hermetically cemented from the outside, e.g., with adhesive steam-tight foils, e.g., aluminum foils or polyethylene foils.

The invention makes if possible to bear high loads, with a very small use of material, in a load-bearing manner up to the limit of material strength.

I claim:
1. A load-bearing structural assembly comprising
   (a) outer composite shell assemblies forming the sides of said assembly, said shell assemblies being spaced and defining a cavity therebetween,
   (b) an intermediate load-bearing composite group disposed in said cavity between and spaced from said outer shell assemblies, and
   (c) cellular web assemblies disposed respectively between said intermediate composite group and outer shell assemblies, said web assemblies being formed with inserts at either side thereof which serve to initially space said outer composite shell assemblies from said intermediate load-bearing composite group so as to permit evacuation or pressurization during the formation of the structural assembly, said inserts being compressed during such formation, said web assemblies having lateral edges which are tightly and compressively engaged by said intermediate composite group and said shell assemblies thereby to seal off the individual cells in said web assemblies, whereby the desired pressure conditions can be maintained in said web assemblies.

2. The structural assembly of claim 1 wherein a metal foil is provided on the inner surface of each of said outer shell assemblies, and said intermediate load-bearing composite group comprises metal sheets and plastic layers assembled in composite form, with a metal foil being integrally provided at each side of said composite group.

3. The structural assembly of claim 1 further including a screw assembly extending through said structural assembly and associated with said outer shell assemblies for maintaining said structural assembly in its formed condition.

4. A load-bearing structural assembly comprising
   (a) outer composite shell assemblies forming the sides of said assembly, said shell assemblies including metal plates and being spaced and defining a cavity therebetween,
   (b) an intermediate load-bearing composite group disposed in said cavity between and spaced from said outer shell, said composite group including spaced metal plates,
   (c) metallic cellular web assemblies disposed respectively between said intermediate composite group and said outer shell assemblies, said web assemblies having lateral edges which are tightly and compressively engaged by said intermediate composite group and said shell assemblies thereby to seal off the individual cells in said web assemblies, whereby the desired pressure conditions can be maintained in said web assemblies; said outer composite shell assemblies, said cellular web assemblies and said intermediate load-bearing composite group being welded together, and
   (d) an adjustable screw assembly extending through said structural assembly and associated with said outer shell assemblies for maintaining said structural assembly in its formed condition.

5. The structural assembly of claim 1 wherein said screw assembly comprises a female sleeve member rigidly secured to one of said outer shell assemblies and a screw threadedly received at one end thereof in said sleeve, said screw having mounted on the opposite end thereof disc means engaging the exterior surface of the other of said outer shell assemblies, rotation of said disc thereby controlling the penetration of said screw into said sleeve and thus the degree of compression of said structural element.

6. A load-bearing structural assembly comprising
   (a) outer composite shell assemblies forming the sides of said assembly, said outer shell assemblies including laterally extending side wall portions at each end thereof,
   (b) elastically compressible packing means receiving said laterally extending side wall portions of said outer composite shell assemblies, said packing means and said outer shell assemblies defining a cavity which can be pressurized during the formation of said structural assembly,
   (c) An intermediate load-bearing composite group disposed in said cavity between and spaced from said outer shell assemblies and within said laterally extending side walls, and
   (d) metallic cellular honeycomb plates integrally formed with each outer shell assembly and extending between said intermediate composite group and said outer shell assemblies, the lateral edges of said honeycomb plates being tightly and compressively engaged by adjoining faces of said intermediate composite group thereby to seal off the individual cells in said plates, whereby the desired pressure condition can be maintained in said honeycomb plates.

7. The structural assembly of claim 6 wherein said composite group consists of flexure-resistant supporting plates and honeycomb plates.

8. The structural assembly of claim 6 further including stop means for maintaining said structural assembly in its formed condition.

9. The structural assembly of claim 6 further including a bolt assembly extending through said structural assembly for maintaining said outer composite shell assemblies in their formed condition.

10. A load-bearing structural assembly comprising
(a) outer composite shell assemblies forming the sides of said assembly, said shell assemblies being spaced and defining a cavity therebeween,
(b) first cellular web assemblies rigidly secured to said outer shell assemblies on the inner faces thereof,
(c) a pair of intermediate load-bearing composite groups disposed in said cavity inwardly of said cellular web assemblies, and
(d) a further cellular web assembly disposed between said intermediate composite groups, all of said cellular web assemblies being initially spaced from said intermediate composite groups and in the completed structural assembly tightly and compressively engaging the adjacent faces of said groups thereby to seal off the individual cells in said web assemblies, whereby the desired pressure conditions can be maintained in said web assemblies 11. The structural assembly of claim 10 wherein each outer composite shell assembly comprises metal sheets and a plastic layer therebetween, with said first cellular web assemblies being heremetically secured to the inner surface of the innermost metal sheet.

* * * * *